US008370245B2

(12) United States Patent
Gunther

(10) Patent No.: US 8,370,245 B2
(45) Date of Patent: Feb. 5, 2013

(54) ELECTRONIC INFORMATION AND ANALYSIS SYSTEM

(76) Inventor: Nicholas Langdon Gunther, Stamford, CT (US)

( * ) Notice: Subject to any disclaimer, the term of this patent is extended or adjusted under 35 U.S.C. 154(b) by 0 days.

(21) Appl. No.: 13/215,209

(22) Filed: Aug. 22, 2011

(65) Prior Publication Data

US 2012/0047090 A1 Feb. 23, 2012

Related U.S. Application Data

(60) Provisional application No. 61/375,590, filed on Aug. 20, 2010, provisional application No. 61/525,978, filed on Aug. 22, 2011.

(51) Int. Cl.
*G06Q 40/00* (2012.01)
(52) U.S. Cl. ............... 705/36 R; 705/35; 705/37
(58) Field of Classification Search .................. None
See application file for complete search history.

(56) References Cited

U.S. PATENT DOCUMENTS

| | | | |
|---|---|---|---|
| 6,304,858 B1 | 10/2001 | Mosler et al. | |
| 6,772,146 B2 | 8/2004 | Khemlani et al. | |
| 6,839,686 B1* | 1/2005 | Galant | 705/36 R |
| 7,555,454 B2* | 6/2009 | Cooper et al. | 705/36 R |
| 7,596,526 B2* | 9/2009 | Blauvelt et al. | 705/37 |
| 7,620,578 B1* | 11/2009 | Belton et al. | 705/35 |
| 7,734,533 B2 | 6/2010 | Mackey, Jr. et al. | |
| 7,774,266 B1* | 8/2010 | Huang | 705/37 |
| 7,783,550 B1* | 8/2010 | Schwartz et al. | 705/36 R |
| 7,801,789 B1* | 9/2010 | Cohler et al. | 705/36 R |
| 7,930,232 B2* | 4/2011 | Cooper et al. | 705/36 R |
| 7,979,330 B2* | 7/2011 | Cumming | 705/35 |
| 2002/0019789 A1* | 2/2002 | Ginsberg | 705/36 |
| 2002/0099651 A1* | 7/2002 | May | 705/38 |
| 2002/0188553 A1* | 12/2002 | Blauvelt et al. | 705/37 |
| 2003/0023525 A1* | 1/2003 | Chen | 705/35 |
| 2003/0093351 A1 | 5/2003 | Sarabanchong | |
| 2003/0135447 A1* | 7/2003 | Blanz et al. | 705/38 |
| 2003/0182220 A1* | 9/2003 | Galant | 705/36 |
| 2003/0187761 A1* | 10/2003 | Olsen et al. | 705/35 |
| 2004/0117282 A1* | 6/2004 | Green et al. | 705/35 |
| 2005/0102224 A1* | 5/2005 | Blanz et al. | 705/38 |
| 2005/0273408 A1 | 12/2005 | Bandman et al. | |
| 2007/0016509 A1 | 1/2007 | Vogel | |
| 2007/0061452 A1 | 3/2007 | Weinstein et al. | |
| 2007/0118455 A1* | 5/2007 | Albert et al. | 705/37 |
| 2007/0118460 A1* | 5/2007 | Bauerschmidt et al. | 705/37 |
| 2007/0118467 A1* | 5/2007 | Lawrence | 705/37 |
| 2007/0156573 A1* | 7/2007 | Whitehurst et al. | 705/37 |
| 2007/0219895 A1* | 9/2007 | Cooper et al. | 705/36 R |
| 2007/0239591 A1* | 10/2007 | May | 705/37 |
| 2007/0288351 A1* | 12/2007 | Huntley | 705/37 |
| 2008/0167981 A1* | 7/2008 | Whitehurst et al. | 705/37 |
| 2008/0249956 A1* | 10/2008 | Connors | 705/36 R |
| 2008/0270322 A1* | 10/2008 | Cooper et al. | 705/36 R |

(Continued)

OTHER PUBLICATIONS

Darrell Duffie, Dynamic Asset Pricing, p. 31 (3rd ed Princeton University Press 2001).

(Continued)

*Primary Examiner* — Gregory Johnson
(74) *Attorney, Agent, or Firm* — David Garrod

(57) ABSTRACT

An automated information and analysis system and methods, including methods to acquire information, which may include financial market data such as rates or prices, from one or more external sources, and to process, enhance, extend or otherwise develop that information to derive additional, different, modified or otherwise developed information which, separately or together with the original acquired information, provides to users additional, different or modified utility relative to the utility that the original acquired information provides alone.

20 Claims, 21 Drawing Sheets

U.S. PATENT DOCUMENTS

| | | | | |
|---|---|---|---|---|
| 2009/0248564 A1* | 10/2009 | Fallon et al. | ...................... | 705/37 |
| 2010/0063915 A1 | 3/2010 | Tian et al. | | |
| 2011/0153521 A1* | 6/2011 | Green et al. | ................ | 705/36 R |
| 2011/0213692 A1* | 9/2011 | Crowe et al. | ..................... | 705/37 |
| 2012/0047090 A1* | 2/2012 | Gunther | ...................... | 705/36 R |

OTHER PUBLICATIONS

John Hull, Options, Futures, and Other Derivatives, pp. 78-85, 291-293 (7th ed. Prentice Hall 2002).

Ferstl & Hayden, Zero-Coupon Yield Curve Estimation with the Package termstrc, Journal of Statistical Software, Issue 1 vol. 36 (Aug. 2010)(available at http://www.jstatsoft.org/v36/i01/paper).

Monetary and Economic Department, "Zero-coupon yield curves: technical documentation," 25 BIS Papers (Oct. 2005)(available at http://www.bis.org/publ/bppdf/bispap25.pdf).

United States Federal Reserve, Daily H15 Page (available at http://www.federalreserve.gov/releases/h15/update/default.htm), Aug. 13, 2012.

European Central Bank, Euro Area Yield Curve and hyperlinked data (available at http://www.ecb.europa.eu/stats/money/yc/html/index.en.html), Jan. 17, 2012.

IPA Ruby Standardization Working Group, Ruby Draft Specification (available at http://www.ipa.go.jp/osc/english/ruby/), Aug. 13, 2012.

Teukolosky, Vetterling, Flannery, Numerical Recipes in C, p. 376 (2nd ed Cambridge University Press 1992).

* cited by examiner

FIG. 7B

Date Reported: 2011-Aug-12
Date of Curve: 2011-Aug-11
All Rates in Decimal Notation; Original Rates from Federal Reserve Publication H15
CFRSwap Rate: Interpolation MConstant Forward Rate Interpolation

| Maturity | Tenor in Months | Interpolated | Par Rate | Zero Price | Continuous Zero Rate | O1 | AdjO1 (Duration) | Continuous Forward Rate | Period Discount | Day CountBasis | Type | Annualized Rate |
|---|---|---|---|---|---|---|---|---|---|---|---|---|
| Sep-11-2011 | 1 | ORIGINAL | 0.0025 | 0.999788818 | 0.002534455 | 0.999788818 | 0.083315735 | 0.002534455 | 0.999788818 | Act/360 | Eurodollar | 0.002534722 |
| Nov-11-2011 | 3 | ORIGINAL | 0.0037 | 0.999063032 | 0.003749631 | 0.999063032 | 0.249765758 | 0.003749631 | 0.999063032 | Act/360 | Eurodollar | 0.003751389 |
| Feb-11-2012 | 6 | ORIGINAL | 0.0051 | 0.997421251 | 0.005164161 | 0.997421251 | 0.498710625 | 0.005164161 | 0.997421251 | Act/360 | Eurodollar | 0.005170833 |
| Aug-11-2012 | 12 | ORIGINAL | 0.0044 | 0.995614532 | 0.004394321 | 1.993036657 | 0.996518285 | 0.003624882 | 0.99981894 | 30/360 | Swap | 0.0044 |
| Feb-11-2013 | 18 | INTERPOLATED | 0.004533334 | 0.993231117 | 0.004527931 | 2.986267687 | 1.493133843 | 0.004795915 | 0.997605297 | 30/360 | Swap | 0.004533334 |
| Aug-11-2013 | 24 | ORIGINAL | 0.0046 | 0.990852623 | 0.004594735 | 3.977120301 | 1.988560155 | 0.004795915 | 0.997605297 | 30/360 | Swap | 0.0046 |
| Feb-11-2014 | 30 | INTERPOLATED | 0.005560467 | 0.98620081 | 0.005558114 | 4.96332112 | 2.48166056 | 0.009411627 | 0.995305242 | 30/360 | Swap | 0.005560467 |
| Aug-11-2014 | 36 | ORIGINAL | 0.0062 | 0.981570835 | 0.006200366 | 5.944891955 | 2.972445977 | 0.009411627 | 0.995305242 | 30/360 | Swap | 0.0062 |
| Feb-11-2015 | 42 | INTERPOLATED | 0.007974134 | 0.972420214 | 0.007990643 | 6.917312168 | 3.458656084 | 0.018732303 | 0.990677574 | 30/360 | Swap | 0.007974134 |
| Aug-11-2015 | 48 | ORIGINAL | 0.0093 | 0.963354898 | 0.009333335 | 7.880667066 | 3.940333533 | 0.018732303 | 0.990677574 | 30/360 | Swap | 0.0093 |
| Feb-11-2016 | 54 | INTERPOLATED | 0.011081465 | 0.951065733 | 0.011149355 | 8.831732799 | 4.4158664 | 0.025677395 | 0.987243367 | 30/360 | Swap | 0.011081465 |
| Aug-11-2016 | 60 | ORIGINAL | 0.0125 | 0.938933337 | 0.012602159 | 9.770666136 | 4.885333068 | 0.025677395 | 0.987243367 | 30/360 | Swap | 0.0125 |
| Feb-11-2017 | 66 | INTERPOLATED | 0.014359264 | 0.923221822 | 0.014524681 | 10.69388796 | 5.346943979 | 0.0337499 | 0.983266634 | 30/360 | Swap | 0.014359264 |
| Aug-11-2017 | 72 | INTERPOLATED | 0.015898893 | 0.907773214 | 0.016126783 | 11.60166117 | 5.800830586 | 0.0337499 | 0.983266634 | 30/360 | Swap | 0.015898893 |
| Feb-11-2018 | 78 | INTERPOLATED | 0.017194619 | 0.892583113 | 0.017482407 | 12.49424428 | 6.247122142 | 0.0337499 | 0.983266634 | 30/360 | Swap | 0.017194619 |
| Aug-11-2018 | 84 | ORIGINAL | 0.0183 | 0.877647193 | 0.018644371 | 13.37189148 | 6.685945739 | 0.038357885 | 0.981003803 | 30/360 | Swap | 0.0183 |
| Feb-11-2019 | 90 | INTERPOLATED | 0.019535736 | 0.860975234 | 0.019958605 | 14.23286671 | 7.116433356 | 0.038357885 | 0.981003803 | 30/360 | Swap | 0.019535736 |
| Aug-11-2019 | 96 | INTERPOLATED | 0.020610865 | 0.844619979 | 0.02110856 | 15.07748669 | 7.538743345 | 0.038357885 | 0.981003803 | 30/360 | Swap | 0.020610865 |
| Feb-11-2020 | 102 | INTERPOLATED | 0.021554623 | 0.828575412 | 0.022123226 | 15.9060621 | 7.953031051 | 0.038357885 | 0.981003803 | 30/360 | Swap | 0.021554623 |
| Aug-11-2020 | 108 | INTERPOLATED | 0.022389559 | 0.81283563 | 0.023025152 | 16.71889773 | 8.359448866 | 0.038357885 | 0.981003803 | 30/360 | Swap | 0.022389559 |
| Feb-11-2021 | 114 | INTERPOLATED | 0.023133338 | 0.797394844 | 0.023832138 | 17.51629258 | 8.758146288 | 0.038357885 | 0.981003803 | 30/360 | Swap | 0.023133338 |
| Aug-11-2021 | 120 | ORIGINAL | 0.0238 | 0.782247375 | 0.024558425 | 18.29853995 | 9.149269975 | 0.038357885 | 0.981003803 | 30/360 | Swap | 0.0238 |
| Feb-11-2022 | 126 | INTERPOLATED | 0.024456992 | 0.766858852 | 0.025281192 | 19.0653988 | 9.532699401 | 0.039736536 | 0.980327805 | 30/360 | Swap | 0.024456992 |
| Aug-11-2022 | 132 | INTERPOLATED | 0.025051702 | 0.751773056 | 0.025938254 | 19.81717186 | 9.908585929 | 0.039736536 | 0.980327805 | 30/360 | Swap | 0.025051702 |
| Feb-11-2023 | 138 | INTERPOLATED | 0.025592486 | 0.736988403 | 0.026538179 | 20.55415589 | 10.27707794 | 0.039736536 | 0.980327805 | 30/360 | Swap | 0.025592486 |
| Aug-11-2023 | 144 | INTERPOLATED | 0.026086266 | 0.722485936 | 0.02708811 | 21.27664182 | 10.63832091 | 0.039736536 | 0.980327805 | 30/360 | Swap | 0.026086266 |
| Feb-11-2024 | 150 | INTERPOLATED | 0.026538829 | 0.708273053 | 0.027594047 | 21.98491488 | 10.99245744 | 0.039736536 | 0.980327805 | 30/360 | Swap | 0.026538829 |

FIG. 7C

| Date | Days | Value | Type | Col5 | Col6 | Col7 | Col8 | Col9 |
|---|---|---|---|---|---|---|---|---|
| Aug-11-2024 | 156 | INTERPOLATED | 0.026955051 | 0.694339767 | 0.028061066 | 22.67925464 | 11.33962732 | 0.039736536 | 0.980327805 | 30/360 | Swap | 0.026955051 |
| Feb-11-2025 | 162 | INTERPOLATED | 0.027339067 | 0.680680058 | 0.028493491 | 23.35993522 | 11.67996761 | 0.039736536 | 0.980327805 | 30/360 | Swap | 0.027339067 |
| Aug-11-2025 | 168 | INTERPOLATED | 0.027694409 | 0.667290099 | 0.028850028 | 24.02722532 | 12.01361266 | 0.039736536 | 0.980327805 | 30/360 | Swap | 0.027694409 |
| Feb-11-2026 | 174 | INTERPOLATED | 0.028024109 | 0.654163039 | 0.029268873 | 24.68138836 | 12.34069418 | 0.039736536 | 0.980327805 | 30/360 | Swap | 0.028024109 |
| Aug-11-2026 | 180 | INTERPOLATED | 0.028330789 | 0.641294216 | 0.029617796 | 25.32268258 | 12.66134129 | 0.039736536 | 0.980327805 | 30/360 | Swap | 0.028330789 |
| Feb-11-2027 | 186 | INTERPOLATED | 0.028616722 | 0.628678551 | 0.029944206 | 25.95136113 | 12.97568056 | 0.039736536 | 0.980327805 | 30/360 | Swap | 0.028616722 |
| Aug-11-2027 | 192 | INTERPOLATED | 0.028883896 | 0.616311065 | 0.030250217 | 26.56767677219 | 13.2838361 | 0.039736536 | 0.980327805 | 30/360 | Swap | 0.028883896 |
| Feb-11-2028 | 198 | INTERPOLATED | 0.029134048 | 0.604186874 | 0.030537681 | 27.17185907 | 13.58592953 | 0.039736536 | 0.980327805 | 30/360 | Swap | 0.029134048 |
| Aug-11-2028 | 204 | INTERPOLATED | 0.029368712 | 0.592301192 | 0.030808236 | 27.76416026 | 13.88208013 | 0.039736536 | 0.980327805 | 30/360 | Swap | 0.029368712 |
| Feb-11-2029 | 210 | INTERPOLATED | 0.029589239 | 0.580649327 | 0.031063333 | 28.34480959 | 14.17240479 | 0.039736536 | 0.980327805 | 30/360 | Swap | 0.029589239 |
| Aug-11-2029 | 216 | INTERPOLATED | 0.029796831 | 0.569226681 | 0.031304252 | 28.91403627 | 14.45701813 | 0.039736536 | 0.980327805 | 30/360 | Swap | 0.029796831 |
| Feb-11-2030 | 222 | INTERPOLATED | 0.029992554 | 0.558028743 | 0.031532152 | 29.47206501 | 14.7360325 | 0.039736536 | 0.980327805 | 30/360 | Swap | 0.029992554 |
| Aug-11-2030 | 228 | INTERPOLATED | 0.030177365 | 0.547051093 | 0.031748057 | 30.01911161 | 15.00955805 | 0.039736536 | 0.980327805 | 30/360 | Swap | 0.030177365 |
| Feb-11-2031 | 234 | INTERPOLATED | 0.030352116 | 0.536289397 | 0.031952889 | 30.5554055 | 15.27770275 | 0.039736536 | 0.980327805 | 30/360 | Swap | 0.030352116 |
| Aug-11-2031 | 240 | INTERPOLATED | 0.030517575 | 0.525739408 | 0.032147481 | 31.08114491 | 15.54057245 | 0.039736536 | 0.980327805 | 30/360 | Swap | 0.030517575 |
| Feb-11-2032 | 246 | INTERPOLATED | 0.030674435 | 0.515396696 | 0.032332258 | 31.59654187 | 15.79827093 | 0.039736536 | 0.980327805 | 30/360 | Swap | 0.030674435 |
| Aug-11-2032 | 252 | INTERPOLATED | 0.03082332 | 0.505257971 | 0.032508864 | 32.10179984 | 16.05089992 | 0.039736536 | 0.980327805 | 30/360 | Swap | 0.03082332 |
| Feb-11-2033 | 258 | INTERPOLATED | 0.030964796 | 0.495318438 | 0.03267695 | 32.59711828 | 16.29855914 | 0.039736536 | 0.980327805 | 30/360 | Swap | 0.030964796 |
| Aug-11-2033 | 264 | INTERPOLATED | 0.031099377 | 0.485574437 | 0.032837395 | 33.08269271 | 16.54134636 | 0.039736536 | 0.980327805 | 30/360 | Swap | 0.031099377 |
| Feb-11-2034 | 270 | INTERPOLATED | 0.031122753 | 0.476022122 | 0.032990709 | 33.55871483 | 16.77935742 | 0.039736536 | 0.980327805 | 30/360 | Swap | 0.031122753 |
| Aug-11-2034 | 276 | INTERPOLATED | 0.03134968 | 0.466657722 | 0.033137357 | 34.02537256 | 17.01268628 | 0.039736536 | 0.980327805 | 30/360 | Swap | 0.03134968 |
| Feb-11-2035 | 282 | INTERPOLATED | 0.031466219 | 0.457477541 | 0.033277765 | 34.48285012 | 17.24142505 | 0.039736536 | 0.980327805 | 30/360 | Swap | 0.031466219 |
| Aug-11-2035 | 288 | INTERPOLATED | 0.031577502 | 0.448477954 | 0.033412323 | 34.93132805 | 17.46566403 | 0.039736536 | 0.980327805 | 30/360 | Swap | 0.031577502 |
| Feb-11-2036 | 294 | INTERPOLATED | 0.031683857 | 0.439655408 | 0.033541389 | 35.37098346 | 17.68549173 | 0.039736536 | 0.980327805 | 30/360 | Swap | 0.031683857 |
| Aug-11-2036 | 300 | INTERPOLATED | 0.031785584 | 0.431006421 | 0.033665292 | 35.80198988 | 17.90099494 | 0.039736536 | 0.980327805 | 30/360 | Swap | 0.031785584 |
| Feb-11-2037 | 306 | INTERPOLATED | 0.03188296 | 0.422527579 | 0.033784336 | 36.22451746 | 18.11225873 | 0.039736536 | 0.980327805 | 30/360 | Swap | 0.03188296 |
| Aug-11-2037 | 312 | INTERPOLATED | 0.03197624 | 0.414215534 | 0.033898801 | 36.63873299 | 18.3193665 | 0.039736536 | 0.980327805 | 30/360 | Swap | 0.03197624 |
| Feb-11-2038 | 318 | INTERPOLATED | 0.032065661 | 0.406067006 | 0.034008947 | 37.0448 | 18.5224 | 0.039736536 | 0.980327805 | 30/360 | Swap | 0.032065661 |
| Aug-11-2038 | 324 | INTERPOLATED | 0.032151439 | 0.398078777 | 0.034115013 | 37.44287878 | 18.72143939 | 0.039736536 | 0.980327805 | 30/360 | Swap | 0.032151439 |
| Feb-11-2039 | 330 | INTERPOLATED | 0.032233778 | 0.390247693 | 0.034217223 | 37.83312647 | 18.91656323 | 0.039736536 | 0.980327805 | 30/360 | Swap | 0.032233778 |
| Aug-11-2039 | 336 | INTERPOLATED | 0.032312865 | 0.382570665 | 0.034315782 | 38.21569713 | 19.10784857 | 0.039736536 | 0.980327805 | 30/360 | Swap | 0.032312865 |
| Feb-11-2040 | 342 | INTERPOLATED | 0.032388874 | 0.375044466 | 0.034410883 | 38.59074179 | 19.29537090 | 0.039736536 | 0.980327805 | 30/360 | Swap | 0.032388874 |
| Aug-11-2040 | 348 | INTERPOLATED | 0.032461967 | 0.367666709 | 0.034502705 | 38.9584085 | 19.47920425 | 0.039736536 | 0.980327805 | 30/360 | Swap | 0.032461967 |
| Feb-11-2041 | 354 | INTERPOLATED | 0.032532296 | 0.360433898 | 0.034591414 | 39.3188424 | 19.6594212 | 0.039736536 | 0.980327805 | 30/360 | Swap | 0.032532296 |
| Aug-11-2041 | 360 | ORIGINAL | 0.0326 | 0.353343372 | 0.034677166 | 39.67218577 | 19.83609289 | 0.039736536 | 0.980327805 | 30/360 | Swap | 0.0326 |

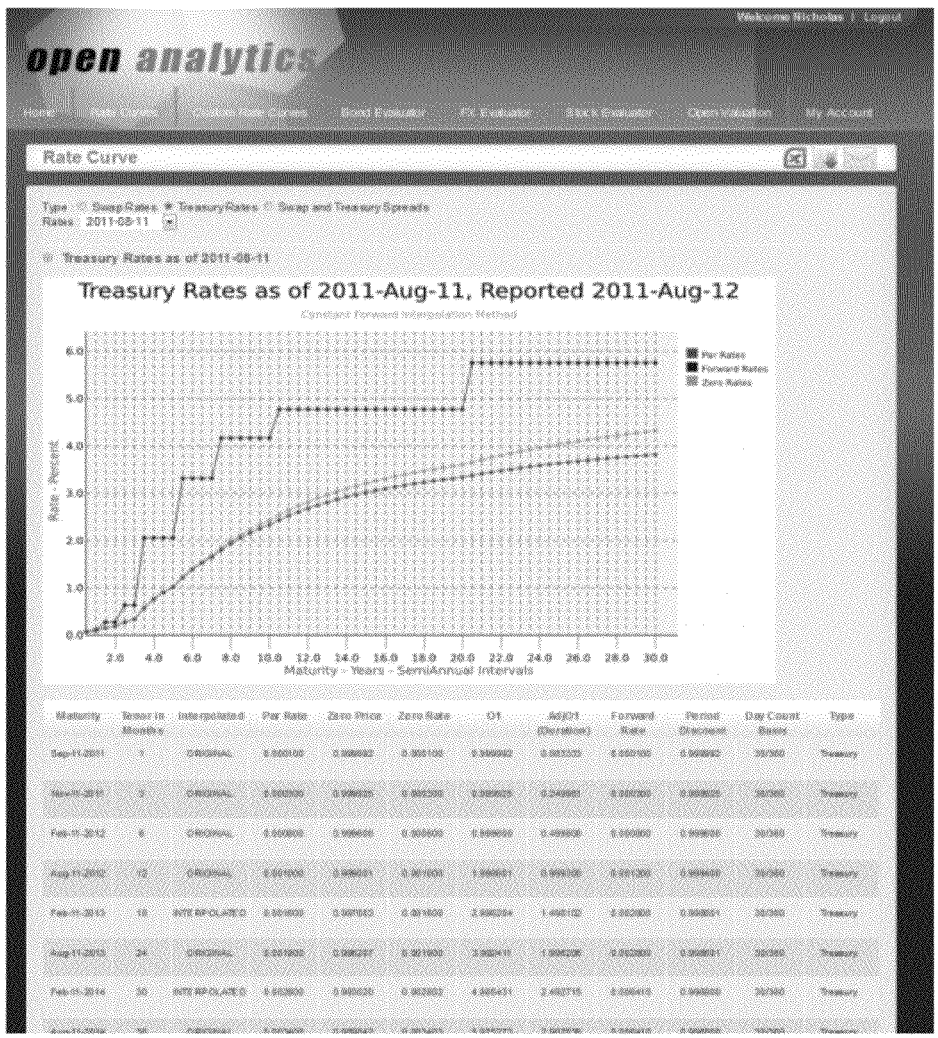
FIG. 8

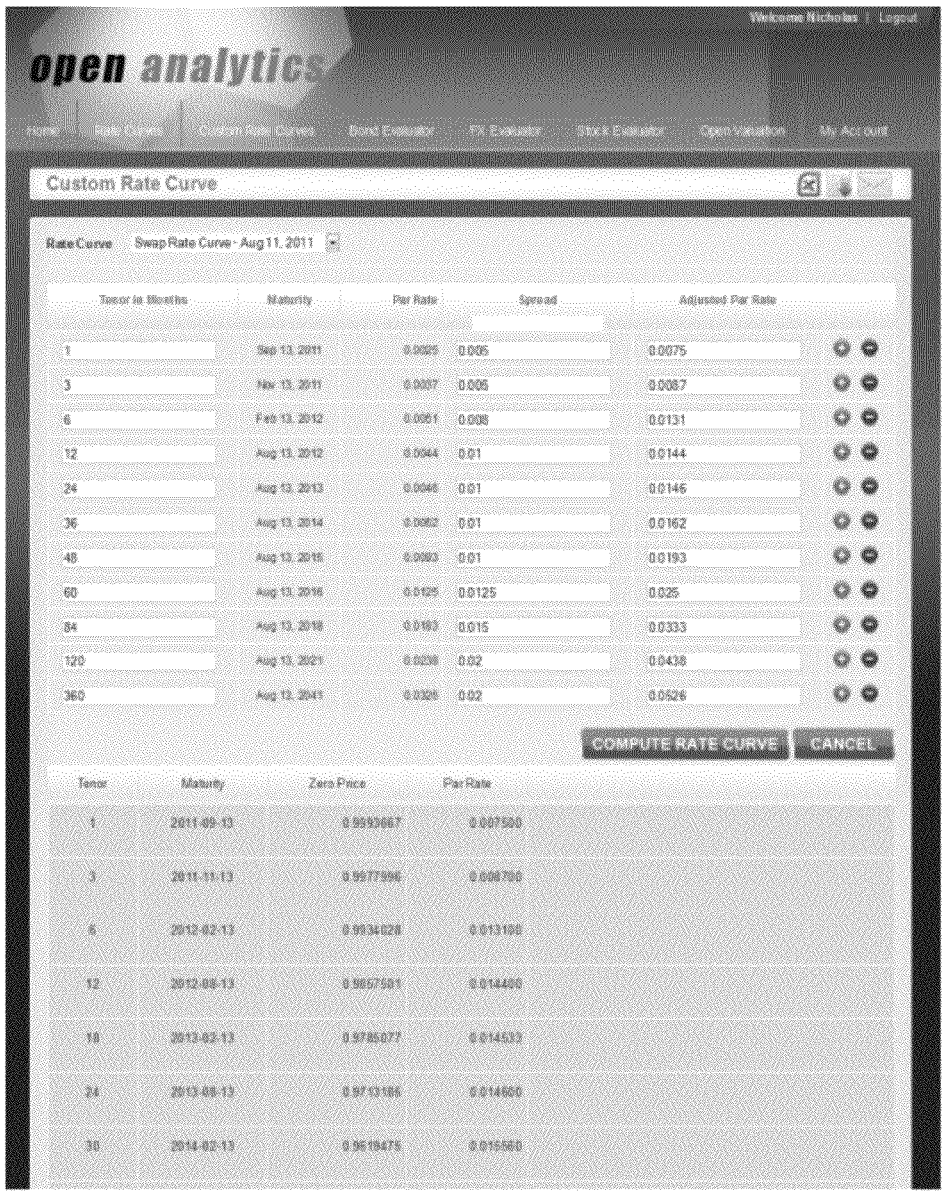
FIG. 10

FIG. 14A

FEDERAL RESERVE STATISTICAL RELEASE

H.15 (519) SELECTED INTEREST RATES
For use at 2:30 p.m. Eastern Time

July 12, 2010

Yields in percent per annum

| Instruments | 2010 Jul 5* | 2010 Jul 6 | 2010 Jul 7 | 2010 Jul 8 | 2010 Jul 9 | Week Ending Jul 9 | Week Ending Jul 2 | 2010 Jun |
|---|---|---|---|---|---|---|---|---|
| Federal funds (effective) 1 2 3 | 0.18 | 0.18 | 0.18 | 0.17 | 0.18 | 0.18 | 0.15 | 0.18 |
| Commercial Paper 3 4 5 6 | | | | | | | | |
| Nonfinancial | | | | | | | | |
| 1-month | | 0.20 | 0.21 | 0.20 | 0.17 | 0.20 | 0.18 | 0.19 |
| 2-month | | 0.19 | 0.21 | 0.20 | 0.24 | 0.21 | 0.22 | 0.24 |
| 3-month | | 0.30 | 0.30 | 0.26 | n.a. | 0.29 | 0.32 | 0.32 |
| Financial | | | | | | | | |
| 1-month | | 0.24 | 0.23 | 0.27 | 0.25 | 0.25 | 0.21 | 0.24 |
| 2-month | | 0.32 | 0.32 | 0.28 | 0.30 | 0.31 | 0.32 | 0.36 |
| 3-month | | 0.48 | 0.50 | 0.36 | 0.38 | 0.43 | 0.41 | 0.46 |
| CDs (secondary market) 3 7 | | | | | | | | |
| 1-month | | 0.30 | 0.29 | 0.29 | 0.29 | 0.29 | 0.31 | 0.33 |
| 3-month | | 0.47 | 0.43 | 0.43 | 0.43 | 0.44 | 0.48 | 0.52 |
| 6-month | | 0.72 | 0.68 | 0.67 | 0.67 | 0.69 | 0.71 | 0.75 |
| Eurodollar deposits (London) 3 8 | | | | | | | | |
| 1-month | | 0.45 | 0.40 | 0.45 | 0.45 | 0.44 | 0.45 | 0.44 |
| 2-month | | 0.62 | 0.50 | 0.62 | 0.62 | 0.59 | 0.62 | 0.61 |
| 3-month | | 0.75 | 0.70 | 0.75 | 0.75 | 0.74 | 0.76 | 0.75 |
| Bank prime loan 2 3 9 | 3.25 | 3.25 | 3.25 | 3.25 | 3.25 | 3.25 | 3.25 | 3.25 |
| Discount window primary credit 2 10 | 0.75 | 0.75 | 0.75 | 0.75 | 0.75 | 0.75 | 0.75 | 0.75 |
| U.S. government securities | | | | | | | | |
| Treasury bills (secondary market) 3 4 | | | | | | | | |
| 4-week | | 0.17 | 0.17 | 0.17 | 0.16 | 0.17 | 0.13 | 0.08 |
| 3-month | | 0.17 | 0.16 | 0.15 | 0.16 | 0.16 | 0.17 | 0.12 |
| 6-month | | 0.21 | 0.20 | 0.19 | 0.20 | 0.20 | 0.22 | 0.19 |
| 1-year | | 0.31 | 0.30 | 0.29 | 0.29 | 0.30 | 0.30 | 0.30 |
| Treasury constant maturities | | | | | | | | |
| Nominal 11 | | | | | | | | |

FIG. 14B

|  | | | | | | | |
|---|---|---|---|---|---|---|---|
| 1-month | 0.17 | 0.17 | 0.17 | 0.16 | 0.17 | 0.13 | 0.08 |
| 3-month | 0.17 | 0.16 | 0.15 | 0.16 | 0.16 | 0.17 | 0.12 |
| 6-month | 0.21 | 0.20 | 0.19 | 0.20 | 0.20 | 0.22 | 0.19 |
| 1-year | 0.32 | 0.31 | 0.30 | 0.30 | 0.31 | 0.31 | 0.32 |
| 2-year | 0.62 | 0.63 | 0.63 | 0.63 | 0.63 | 0.62 | 0.72 |
| 3-year | 1.00 | 1.01 | 1.01 | 1.03 | 1.01 | 1.01 | 1.17 |
| 5-year | 1.76 | 1.79 | 1.80 | 1.85 | 1.80 | 1.80 | 2.00 |
| 7-year | 2.40 | 2.45 | 2.48 | 2.52 | 2.46 | 2.45 | 2.66 |
| 10-year | 2.95 | 3.00 | 3.04 | 3.07 | 3.02 | 2.99 | 3.20 |
| 20-year | 3.71 | 3.78 | 3.81 | 3.85 | 3.79 | 3.76 | 3.95 |
| 30-year | 3.89 | 3.96 | 4.00 | 4.04 | 3.97 | 3.94 | 4.13 |
| Inflation indexed 12 | | | | | | | |
| 5-year | 0.35 | 0.39 | 0.37 | 0.37 | 0.37 | 0.28 | 0.34 |
| 7-year | 0.77 | 0.81 | 0.76 | 0.74 | 0.77 | 0.69 | 0.76 |
| 10-year | 1.26 | 1.30 | 1.25 | 1.26 | 1.27 | 1.19 | 1.26 |
| 20-year | 1.71 | 1.78 | 1.60 | 1.62 | 1.68 | 1.67 | 1.69 |
| 30-year | 1.80 | 1.85 | 1.82 | 1.83 | 1.83 | 1.74 | 1.77 |
| Inflation-indexed long-term average 13 | 1.74 | 1.80 | 1.76 | 1.77 | 1.77 | 1.69 | 1.72 |
| Interest rate swaps 14 | | | | | | | |
| 1-year | 0.70 | 0.67 | 0.66 | 0.66 | 0.67 | 0.72 | 0.78 |
| 2-year | 0.98 | 0.94 | 0.95 | 0.95 | 0.96 | 0.98 | 1.11 |
| 3-year | 1.35 | 1.30 | 1.33 | 1.35 | 1.33 | 1.35 | 1.52 |
| 4-year | 1.73 | 1.68 | 1.73 | 1.74 | 1.72 | 1.73 | 1.93 |
| 5-year | 2.07 | 2.03 | 2.08 | 2.10 | 2.07 | 2.07 | 2.29 |
| 7-year | 2.59 | 2.56 | 2.62 | 2.63 | 2.60 | 2.59 | 2.82 |
| 10-year | 3.04 | 3.02 | 3.08 | 3.10 | 3.06 | 3.04 | 3.27 |
| 30-year | 3.73 | 3.73 | 3.80 | 3.83 | 3.77 | 3.75 | 3.95 |
| Corporate bonds | | | | | | | |
| Moody's seasoned | | | | | | | |
| Aaa 15 | 4.64 | 4.71 | 4.75 | 4.79 | 4.72 | 4.69 | 4.88 |
| Baa | 6.00 | 6.08 | 6.11 | 6.14 | 6.08 | 6.06 | 6.23 |
| State & local bonds 16 | | | | 4.36 | 4.36 | 4.38 | 4.36 |
| Conventional mortgages 17 | | | 4.57 | | 4.57 | 4.58 | 4.74 |

\* Markets closed.
n.a. Not available.

FIG. 14C

Footnotes

1. The daily effective federal funds rate is a weighted average of rates on brokered trades.

2. Weekly figures are averages of 7 calendar days ending on Wednesday of the current week; monthly figures include each calendar day in the month.

3. Annualized using a 360-day year or bank interest.

4. On a discount basis.

5. Interest rates interpolated from data on certain commercial paper trades settled by The Depository Trust Company. The trades represent sales of commercial paper by dealers or direct issuers to investors (that is, the offer side). The 1-, 2-, and 3-month rates are equivalent to the 30-, 60-, and 90-day dates reported on the Board's Commercial Paper Web page (www.federalreserve.gov/releases/cp/).

6. Financial paper that is insured by the FDIC's Temporary Liquidity Guarantee Program is not excluded from relevant indexes, nor is any financial or nonfinancial commercial paper that may be directly or indirectly affected by one or more of the Federal Reserve's liquidity facilities. Thus the rates published after September 19, 2008, likely reflect the direct or indirect effects of the new temporary programs and, accordingly, likely are not comparable for some purposes to rates published prior to that period.

7. An average of dealer bid rates on nationally traded certificates of deposit.

8. Bid rates for Eurodollar deposits collected around 9:30 a.m. Eastern time.

9. Rate posted by a majority of top 25 (by assets in domestic offices) insured U.S.-chartered commercial banks. Prime is one of several base rates used by banks to price short-term business loans.

10. The rate charged for discounts made and advances extended under the Federal Reserve's primary credit discount window program, which became effective January 9, 2003. This rate replaces that for adjustment credit, which was discontinued after January 8, 2003. For further information, see

FIG. 15A

Last update: June 3, 2011

The weekly release is posted on Monday. Daily updates of the weekly release are posted Tuesday through Friday on this site. If Monday is a holiday, the weekly release will be posted on Tuesday after the holiday and the daily update will not be posted on that Tuesday.

June 3, 2011 Selected Interest Rates
Yields in percent per annum

| Instruments | ‖ | 2011May30* | ‖ | 2011May31 | ‖ | 2011Jun1 | ‖ | 2011Jun2 | ‖ |
|---|---|---|---|---|---|---|---|---|---|
| Federal funds (effective) 1 2 3 | | | | | | | | | |
| ‖ | 0.10 | ‖ | 0.10 | ‖ | 0.10 | ‖ | | ‖ | |
| Commercial Paper 3 4 5 6 | | | | | | | | | |
| ‖ | ‖ | | ‖ | | ‖ | | ‖ | | |
| ++indent2++Nonfinancial | ‖ | | ‖ | ‖ | | ‖ | ‖ | | |
| ++indent3++1-month ‖ | | ‖ | 0.12 | ‖ | 0.11 | ‖ | 0.12 | ‖ | |
| ++indent3++2-month ‖ | | ‖ | 0.16 | ‖ | 0.15 | ‖ | 0.16 | ‖ | |
| ++indent3++3-month ‖ | | ‖ | 0.16 | ‖ | 0.18 | ‖ | 0.19 | ‖ | |
| ++indent2++Financial | ‖ | | ‖ | ‖ | | ‖ | ‖ | | |
| ++indent3++1-month ‖ | | ‖ | 0.12 | ‖ | 0.11 | ‖ | 0.13 | ‖ | |
| ++indent3++2-month ‖ | | ‖ | 0.11 | ‖ | 0.15 | ‖ | 0.15 | ‖ | |
| ++indent3++3-month ‖ | | ‖ | 0.19 | ‖ | 0.20 | ‖ | 0.16 | ‖ | |
| CDs (secondary market) 3 7 | | | | | | | | | |
| ‖ | ‖ | | ‖ | | ‖ | | ‖ | | |
| ++indent2++1-month ‖ | | ‖ | 0.16 | ‖ | 0.17 | ‖ | 0.17 | ‖ | |
| ++indent2++3-month ‖ | | ‖ | 0.20 | ‖ | 0.22 | ‖ | 0.22 | ‖ | |
| ++indent2++6-month ‖ | | ‖ | 0.29 | ‖ | 0.31 | ‖ | 0.31 | ‖ | |
| Eurodollar deposits (London) 3 8 | | | | | | | | | |
| ‖ | ‖ | | ‖ | | ‖ | | ‖ | | |
| ++indent2++1-month ‖ | 0.26 | ‖ | 0.26 | ‖ | 0.26 | ‖ | 0.26 | ‖ | |
| ++indent2++3-month ‖ | 0.38 | ‖ | 0.38 | ‖ | 0.38 | ‖ | 0.38 | ‖ | |
| ++indent2++6-month ‖ | 0.53 | ‖ | 0.53 | ‖ | 0.53 | ‖ | 0.53 | ‖ | |
| Bank prime loan 2 3 9 | | | | | | | | | |

FIG. 15B

| | Col 1 | Col 2 | Col 3 | Col 4 |
|---|---|---|---|---|
| | 3.25 | 3.25 | 3.25 | 3.25 |
| Discount window primary credit 2 10 | | | | |
| | 0.75 | 0.75 | 0.75 | 0.75 |
| U.S. government securities | | | | |
| ++indent2++Treasury bills (secondary market) 3 4 | | | | |
| ++indent3++4-week | 0.04 | 0.04 | 0.04 | 0.04 |
| ++indent3++3-month | 0.06 | 0.06 | 0.05 | 0.04 |
| ++indent3++6-month | 0.12 | 0.12 | 0.11 | 0.11 |
| ++indent3++1-year | 0.16 | 0.16 | 0.18 | 0.19 |
| ++indent2++Treasury constant maturities | | | | |
| ++indent3++Nominal 11 | | | | |
| ++indent4++1-month | 0.04 | 0.04 | 0.04 | 0.04 |
| ++indent4++3-month | 0.06 | 0.06 | 0.05 | 0.04 |
| ++indent4++6-month | 0.12 | 0.12 | 0.11 | 0.11 |
| ++indent4++1-year | 0.18 | 0.18 | 0.18 | 0.19 |
| ++indent4++2-year | 0.45 | 0.45 | 0.44 | 0.45 |
| ++indent4++3-year | 0.79 | 0.79 | 0.74 | 0.78 |
| ++indent4++5-year | 1.68 | 1.68 | 1.60 | 1.65 |
| ++indent4++7-year | 2.37 | 2.37 | 2.28 | 2.34 |
| ++indent4++10-year | 3.05 | 3.05 | 2.96 | 3.04 |
| ++indent4++20-year | 3.91 | 3.91 | 3.83 | 3.92 |
| ++indent4++30-year | 4.22 | 4.22 | 4.15 | 4.25 |
| ++indent3++Inflation indexed 12 | | | | |
| ++indent4++5-year | −0.32 | −0.32 | −0.39 | −0.37 |
| ++indent4++7-year | 0.29 | 0.29 | 0.22 | 0.21 |
| ++indent4++10-year | 0.80 | 0.80 | 0.74 | 0.78 |
| ++indent4++20-year | 1.51 | 1.51 | 1.47 | 1.55 |
| ++indent4++30-year | 1.80 | 1.80 | 1.75 | 1.80 |
| ++indent2++Inflation-indexed long-term average 13 | | | | |
| | | 1.51 | 1.45 | 1.49 |
| Interest rate swaps 14 | | | | |
| ++indent2++1-year | 0.36 | 0.36 | 0.36 | 0.36 |

FIG. 15C

| | | | | |
|---|---|---|---|---|
| ++indent2++2-year | = | 0.66 | = | 0.63 | = | 0.64 | = |
| ++indent2++3-year | = | 1.10 | = | 1.03 | = | 1.04 | = |
| ++indent2++4-year | = | 1.53 | = | 1.45 | = | 1.46 | = |
| ++indent2++5-year | = | 1.94 | = | 1.85 | = | 1.87 | = |
| ++indent2++7-year | = | 2.58 | = | 2.49 | = | 2.51 | = |
| ++indent2++10-year | = | 3.16 | = | 3.08 | = | 3.11 | = |
| ++indent2++30-year | = | 3.97 | = | 3.91 | = | 3.96 | = |
| Corporate bonds | = | | = | | = | | = |
| ++indent2++Moody's seasoned | | | | | | | = |
| ++indent3++Aaa 15 | 4.94 | | = | | = | | |
| = | = | 4.88 | = | 4.99 | = | | |
| ++indent3++Baa | = | 5.70 | = | 5.64 | = | 5.74 | = |
| State & local bonds 16 | | | | | | | |
| = | = | | = | 4.51 | = | | |
| Conventional mortgages 17 | | | | | | | |
| = | = | | = | 4.55 | = | | |

*Markets closed.

Footnotes
1. The daily effective federal funds rate is a weighted average of rates on brokered trades.

2. Weekly figures are averages of 7 calendar days ending on Wednesday of the current week; monthly figures include each calendar day in the month.

3. Annualized using a 360-day year or bank interest.

4. On a discount basis.

5. Interest rates interpolated from data on certain commercial paper trades settled by The Depository Trust Company. The trades represent sales of commercial paper by dealers or direct issuers to investors (that is, the offer side). The 1-, 2-, and 3-month rates are equivalent to the 30-, 60-, and 90-day dates reported on the Board's Commercial Paper Web page (www.federalreserve.gov/releases/cp/).

6. Financial paper that is insured by the FDIC's Temporary Liquidity Guarantee Program is not excluded from relevant indexes, nor is any financial or nonfinancial commercial paper that may be directly or indirectly affected by one or more of the Federal Reserve's liquidity

ELECTRONIC INFORMATION AND ANALYSIS SYSTEM

CROSS REFERENCE TO RELATED APPLICATIONS

This patent application claims the authority and filing priority of U.S. Provisional Application Nos. 61/375,590 and 61/525,978, both titled "Electronic Information and Analysis System", filed on Aug. 20, 2010 and Aug. 22, 2011 respectively, which are both incorporated by reference herein.

FIELD OF THE INVENTION

The invention relates generally to systems to acquire information, which may include financial market data such as rates or prices, from one or more external sources, and to process, enhance, extend or otherwise develop that acquired information to provide to users additional or modified utility relative to the utility that the original acquired information provides alone.

BACKGROUND OF THE INVENTION

Each day, the financial markets produce a wide variety of market information that continues to evolve dynamically over the course of that day. Much of the financial information that market participants need, however, is not directly observable from the markets, but must be derived from market information through arbitrage relationships, as described below.

By way of illustration, one important example of financial information not directly observable from the markets comprises zero prices and their equivalent, zero rates. On a practical level, zero prices provide the foundations for valuing financial positions, including assets such as stocks and bonds, liabilities such as loans and other financings, and derivatives, and, more generally, for valuing future payments, whether derived from financial or other business projects, or from other sources. On a more theoretical level, zero prices provide a robust and reliable basis for identifying profitable financial transactions, and for managing the risk associated with those transactions, as discussed in, for example, D. Duffie, *Dynamic Asset Pricing* 31 (3rd ed Princeton University Press 2001) and J. Hull, *Options, Futures, and Other Derivatives* (7th ed. Prentice Hall 2008). Another example of unobservable information that market participants need comprises forward rates and forward prices, which generally comprise rates and prices that may be fixed at no cost in the market today for payment or receipt on a specified future date. Although zero and forward rates and prices are generally not directly observable from the financial markets, they may be derived from observable market information through methods comprising mathematical operations that reflect arbitrage relationships. Prior art filings in respect of market information include U.S. Pat. No. 7,734,533, U.S. Pat. No. 6,304,858, U.S. Patent Application No. 2010/0063915, U.S. Patent Application No. 2007/0061452, U.S. Patent Application No. 2007/0016509, U.S. Patent Application No. 2005/0273408 and U.S. Patent Application No. 2003/0093351.

U.S. Patent Application No. 2005/0273408 discloses systems for managing financial market information by generating a multidimensional graphical depiction of market data for at least two financial instruments. U.S. Patent Application No. 2007/0016509 discloses a computer-aided method for establishing a secondary market-relevant price for a bond issued by a corporate entity based in part on accessing data relating to executed secondary market trades for bonds issued by the entity. U.S. Patent Application No. 2007/0016509 also discloses generally a method for generating the portion of an interpolated yield curve relevant to an identified bond with a particular maturity and other specified terms. The curves drawn in the FIGS. 7 through 9 of the '509 application appear to represent simple linear interpolation, although the text of the application references cubic splines.

U.S. Patent Application No. 2007/0016509 discloses a computer aided method for establishing secondary market-relevant prices for corporate bonds which involves accessing data relating to executed secondary market trades for bonds issued by a corporate entity and using a bond pricing model to calculate an anticipated price for another bond issued by that entity. U.S. Pat. No. 6,304,858 discloses a method, system, computer program product, and data structure for trading in which a standardized contract is traded. This filing also states a known mathematical formula for bootstrapping interest rates to compute zero prices, using the resulting zero prices to value an actual or hypothetical bond, generally for purposes of establishing a contract intended to offer the contractual parties similar interest rate sensitivity to that of an interest rate swap. While this patent discloses a single formula for deriving zero prices, it does not disclose any method for obtaining market data, nor does it disclose how its formula, an older one that has several disadvantages relative to more modern methods, such as constant forward rate interpolation, would be implemented in a machine. Other examples of zero price/zero rate estimation appear in the literature, see, e.g., Ferstl & Hayden, "Zero-Coupon Yield Curve Estimation with the Package termstrc," *Journal of Statistical Software*, Issue 1 Vol. 36 (August 2010), Monetary and Economic Department, "Zero-coupon yield curves: technical documentation," 25 *BIS Papers* (October 2005) (available at http://www.bis.org/publ/bppdf/bispap25.pdf), but these, too, typically employ unreliable interpolation methods.

U.S. Patent Application No. 2007/0061452 discloses a system for providing notification, generally through a paging network, of specified market conditions to be monitored. U.S. Pat. No. 6,772,146 discloses a system for retrieval and display of financial information. Users may customize the types of information displayed by a portal display page. U.S. Patent Application No. 2003/0093351 discloses a fixed rate investment value modeling system and methods to calculate the current price or market value of a fixed rate investment, such as a Certificate of Deposit, based on instrument-specific data and market-specific data provided to the system. U.S. Patent Application No. 2010/0063915 similarly discloses a system and methods for providing pricing of mortgage-backed securities and other financial instruments, which determine, among other things, a continuously compounded interest rate spread corresponding to the option adjusted spread prevailing at the market.

Other patent filings in this general area relate primarily to trading. See generally the References in U.S. Pat. No. 7,734,533, disclosing a method and system for providing electronic trading via yield curves and citing extensive filings of related prior art.

Other examples of prior art are commercial information services, such as those provided by Thompson Reuters Corporation or by Bloomberg L.P. The pricing and trading systems of financial institutions, particularly the larger and more sophisticated institutions, comprise much of the prior art on the acquisition, organization, development and display of observable market information and derivation of unobservable information from that observable market information. These systems typically obtain the observable information from prices and rates on specified transactions in "benchmark" financial instruments selected to meet certain requirements, including the following. The instruments must be traded in sufficient amounts and with sufficient regularity that the associated prices or rates are realistic representatives of what can be achieved in the market. The purpose of this requirement is that there should be a "liquid" market for the instruments. In this context, the existence of a "liquid" market for an instrument means, among other things, that at the time a price of or rate on the instrument is observed on contemporaneous market transactions, a hypothetical market participant could purchase or sell a significant amount of that instrument at a price, or invest or issue a significant amount of that instrument at rate, that is reasonably close to the observed price or rate, without affecting instrument's the market price and subject to acceptably small transaction costs. Such transactions costs include the spread between purchasing and selling the instrument, referred to as the "bid-ask spread".

In broad overview, then, many sophisticated financial institutions intend that "benchmark" financial instruments should, among other requirements, have the property that new transactions in those instruments may be executed on close to the same terms as those observed on transactions which have just been executed. In other words, the prices and rates observed on recent "benchmark" instruments should be predictive for the immediate future. As discussed below, notwithstanding this objective, finding prices and rates on observable benchmark instruments with this predictive property can be challenging for even the largest and most sophisticated institutions, particularly with regard to the implicit prices and rates not observable in the market that are derived from observable prices and rates.

Having selected a set of observable "benchmark" instruments meeting the liquidity and other requirements, sophisticated financial institutions obtain the associated prices or rates for the selected "benchmark" instruments from their own trading desks, from third party market makers or other market participants, or from external electronic data sources, and program their computers to compute zero prices and otherwise derive needed unobservable financial information using one or more of the methods known in the financial art, certain of which are described below. The derived information typically includes zero and forward rate information at certain maturities, including periodic maturities, such as semiannually, monthly or daily. A collection of rates of a particular type for every such maturity is often referred to as a "rate curve", "yield curve" or just a "curve", by reference to its shape when graphed. This information is then distributed or otherwise made available to specified individuals, including certain employees of the institution, through the institution's private network.

These existing systems and methods for deriving needed unobservable financial information have numerous problems, including the following. The required private systems and other infrastructure are expensive to establish and maintain, and the systems require frequent time-consuming updates and configuration. Regulatory, organizational, political and other restrictions and requirements lead to duplicate and overlapping systems, further increasing costs. Market disruptions or dislocations disrupt such systems, occasionally producing data that is flawed, misleading or useless, and not infrequently causing such systems to crash. The infrastructure that develops the curves and other information is a component in the institution's larger systems, and so must communicate with, and is dependent upon, other internal and external systems. The communication systems and methods require additional maintenance and configuration for the required interfaces and protocols, providing another source of errors. The instrument-by-instrument approach to data acquisition aggravates the problems. If data for each instrument is acquired separately, the aforementioned problems may arise separately with respect to each instrument or security "feed", corrupting the development of information for all the instruments, since the derived information for a specified maturity frequently depends on all the observed information for all earlier maturities, as well as that for the next consecutive maturity.

These and other problems of existing private systems create high infrastructure and other costs, and also create periodic delays and inaccuracies, and insufficient reliability. Other problems include inconsistency, inaccessibility and lack of transparency. Inconsistency arises because of the instrument-by-instrument approach and the private infrastructure, which must interface with multiple internal systems. Inaccessibility arises because of the private system infrastructure required to access the data, which frequently must be further restricted within an organization for political, organizational and technological reasons. Lack of transparency arises because of organizational and practical issues surrounding private systems, and the desire for privacy. Because the associated processes are bespoke, description, disclosure and communication of these processes, all of which are required for transparency, require significant investment, which the host organization may be unwilling or unable to make. In addition, the private and potentially proprietary nature of the host systems raises further issues of confidentiality. Political and organizational concerns may also limit transparency. In the absence of transparency, the inconsistencies, inefficiencies, outright errors and other problems that systems and methods providing complex data and data processing, such as those discussed above, may develop are difficult to detect and correct. Moreover, corrections, improvements, updates and other modifications to such complex systems are made considerably more difficult by lack of transparency, since the details about the design, performance and even the objectives and history of such systems may not be readily available.

Notwithstanding their lack of transparency, reliability and other problems, these private systems are thought to achieve certain desired objectives, such as privacy, competitive advantage, timeliness and customization. As discussed elsewhere herein, the objectives of privacy and competitive advantage carry a high cost in terms of lack of transparency, and in any event are most valuable to a narrow and highly-specialized segment of market information users. Embodiments of the present invention achieve the remaining objectives almost as well, and in many cases better, than the private systems of prior art, but at far lower cost, while offering transparency and other advantages. First, with respect to privacy and competitive advantage, while certain institutions treat their curve development methodology as proprietary and seek vigorously to keep it confidential, the primary objective of curve development, including zero and forward prices and rates, is to derive accurate and timely information from current observable market levels. Observable information on current market levels is either widely known, or will be so shortly. The more reliable methods of deriving unobservable information, like zero and forward prices, from observable market information are known in the financial art. As discussed above, transparency in respect of derivation methods facilitates diagnosis and correction of problems with, and improvements, updates and modifications to, systems implementing these methods. Because these derivation methods are widely known and widely disseminated, including in the academic community, the competitive advantages of proprietary methods in private systems are modest, and relate primarily to high-frequency proprietary trading, a small community to which the present invention and its embodiments are not primarily directed. As a result, the usefulness of privacy and confidentiality in respect of current market information, and in respect of methodology to acquire such information and derive other information from such acquired information, is modest with respect to most users of such information. By contrast, forecasting models with the objective of predicting future market levels are most valuable when their methodology is confidential, since to obtain a transaction in the market for less than its predicted future market value, the transaction's current market price must not fully reflect that future market value prediction, which is less likely if the prediction is widely known. Confidentiality with respect to future market predictions, and related methodology, is thus potentially very valuable. By making data, including stored data, available to users at low cost, embodiments of the present invention facilitate the research into, and analysis of, current and historic data that developers and users of such predictive models require.

With respect to timeliness, information on prices and rates for transactions that may be executed currently in the market is elusive even in a liquid market. Pricing on transactions that may be executed currently is sometimes referred to as "live" pricing and differs from pricing on past transactions which, however recent, are merely indicative of current market levels.

Unfortunately, the only assured route to currently available "live" prices or rates is to obtain live quotes from a buyer, seller, lender, issuer or other provider of transactions that is prepared to enter into transactions on the quoted terms. Such quotes are, however, too narrow to provide a basis for a curve of prices or rates. Providers generally will not make a broad range of live price or rate quotes available, nor will they hold them open over an extended period as terms upon which the provider feels bound to transact. For one thing, should the market move away from such terms, a provider that held such terms open may experience an economic loss were that provider to transact on those outdated terms. More generally, providers are in the business of transacting, not of providing market information. They may make a price or rate at which they will transact available to a customer for a brief period in order to facilitate a transaction with that customer, assuming the provider believes the customer is negotiating in good faith.

The alternative to live quotes is a list of the prices or rates at which recent transactions have been consummated by third parties. Such a list, because it represents dated information, akin to a car that becomes "used" the moment it is driven off a car dealers' lot, is unlikely to represent the prices and rates that new parties can actually achieve, for several reasons, among them the following. The counterparty in a previous transaction may have fully satisfied their appetite for the particular instrument, and the remaining parties may offer less attractive terms. Even in the absence of market changes, there is no assurance that such a list of executed transactions between particular parties is representative of what transactions are available to different parties, even for transactions in the same size, and even less so for transactions in different sizes.

In short, a discussion with a dealer who stands ready to transact is unlikely to be representative of a full range of available terms, although it may lead to a single transaction on a single set of terms. Such discussions are accordingly inappropriate sources for a full curve. By contrast, a broad list of actual executed transactions may not be representative of the terms a dealer who stands ready to transact will offer for new transactions, although such a list may provide a general indication of such terms. Furthermore, much of most important data is unobservable, and accordingly must be derived by a computational method from the data on such a list. The derivation methods in the financial art rely on certain assumptions, including the assumed absence of arbitrage. As discussed below, this assumption is based on the strong economic forces that arbitrage creates to exploit and eliminate it, through the possibility of a "riskless profit". The rational for this assumption is strong, but that rational does not imply that arbitrage can never exist, only that significant arbitrage is unlikely to persist over an extended period. Moreover, certain other of the assumptions on which the derivation methods rely are based on more general considerations, such as the probable shape of certain rate curves. These assumptions are subject to less certainty than the assumed absence of arbitrage.

For all these reasons, the price and rate curves, and other financial data, derived in the prior financial art have limited predictive accuracy, notwithstanding the emphasis on using recent data to derive them. The derivation methods of prior financial art accordingly have the problems described above, including expense, unreliability, inaccuracy, inconsistency, inaccessibility and lack of transparency, and in addition offer somewhat limited value as predictions of current levels at which new transactions may be executed. As described in greater detail below, embodiments of the present invention solve these problems by achieving low cost, reliability, accuracy, consistency, accessibility and transparency, with only modest loss of predictive value.

Relative to private systems, however, the currently preferred embodiments of the present invention, by achieving transparency, necessarily sacrifice privacy to a certain extent; for example, the development and derivation methods of these embodiments are preferably fully disclosed to users and based on open-source programming tools and systems.

Users may, nonetheless, use the data and other information provided by these embodiments in any manner they see fit, including as the basis for analysis and other processes that are wholly or partially private or proprietary. Moreover, certain embodiments provide and expose one or more application programming interfaces, or "API"s, providing users means to incorporate the information these embodiments provide directly into their own private systems. Other embodiments provide users means to develop private methods that may be incorporated into the embodiments and used exclusively by those users.

As described below, by obtaining benchmark data at low cost, or no cost, from compilations, such as those provided by a public or quasi-public entity such as the Federal Reserve Bank or a financial exchange, the currently preferred embodiments eliminate the costs and many other problems associated with the private systems of the prior financial art. By using such data and standardizing derivation and development methods, these embodiments also provide consistency, reliability, accessibility and transparency. Consistency is enhanced by using data compilations, because the process of acquiring data from each such compilation need only be configured once, rather than instrument by instrument, which is difficult even where the data for all instruments comes from a single source. Changes in compilation formatting and conventions (such as, for example, quotation basis) are infrequent and are typically announced well in advance, facilitating efficient and effective updates to such configuration. Transparency is provided by using, where possible, open source, publicly available software and publicly available data, and fully disclosing all relevant development and derivation methodology, so that users generally may inspect and verify embodiments' data and processes. Similarly, reliability is enhanced by using data distributed widely, for example, by a public or quasi-public entity, and separating all component processes into individual modules, submodules, classes and subclasses that are easy to inspect and maintain. Accessibility is provided by the features just described, and the currently preferred communication methods over one or more public or private computer, telecommunication or other networks, offering access to wide communities of potential users.

Using third-party compilations for data results in a certain amount of delay for the data to be compiled and distributed. However, as a result of the Internet and other advances in telecommunications, the delay associated with distribution is minimal. The delay associated with the compilation process can be meaningful, not infrequently two days or occasionally longer, but, as discussed above, "live" pricing is in any case elusive, and reasonably contemporary data, of the sort currently preferred embodiments of the present invention generally provides, is generally sufficient to analyze potential transactions under current market conditions. Moreover, as indicated above, certain of the currently preferred embodiments of the present invention provide data entry and modification means for users to update, add to or otherwise modify the data the system provides, allowing up-to-the-minute timeliness where users feel it is needed. Certain of these embodiments provide and expose one or more APIs, allowing users to provide real-time data addition, modification and enhancement. Users who require truly live pricing, for example, in connection with transaction execution, will obtain it from transaction providers, as they do currently; embodiments of the present invention provide to such users detailed analytics to interpret and validate the quotes from such transaction providers. In particular, users of these embodiments may enter the new data provided by transaction providers and immediately derive complete rate curves using the embodiments' derivation methodology.

Based on appropriate data, certain embodiments of the present invention will also derive rate curves in one or more currencies, such as US Dollars, European Euros, British Pounds Sterling, Canadian Dollars or Japanese Yen. Certain other embodiments will derive foreign exchange rates, commodity prices, such as oil or soybean contract prices, credit spreads or equity or equity index prices, on a current and a forward basis, or, where available, futures contracts levels. Other embodiments will provide analysis and evaluation of many or most common transactions, including derivatives based on one or more of the foregoing underlying tradable assets, including forward contracts or swaps, or puts, calls or compound, complex or other options, or other derivatives, as described in greater detail in 0 below, "Note on Arbitrage-Free Pricing".

Note on Arbitrage-Free Pricing

One important example of market information, reflected in certain of the present invention's currently preferred embodiments, is that of zero prices. Zero prices, a term familiar to those skilled in the financial art, refer to the prices of zero coupon bonds, which are bonds that provide for only a single payment at maturity and no interim coupon payments. A zero coupon bond thus has only two payments, its issue price and its redemption payment at maturity. Such a bond's yield is thus uniquely specified by (a) the quotient of the latter payment divided by the former payment, together (b) with the bond's maturity. The yield of a bond is a well-known term in the financial art that describes the annual or other periodic rate of economic income a bond provides for its holder, represented by the relationship between the bond's payments that the holder receives relative to the bond's price that its owner pays. For a zero coupon bond, the inverse of this quotient, equal to the bond's issue price divided by its redemption price, is referred to in the financial art as the zero price for that bond, and provides a simple computational method for determining the present value today of any payment on the bond's specified future maturity date made by the issuer of the bond, or other payer of the same credit quality or class. As described below, the required present value is just the nominal value of the future payment multiplied by the zero price.

In the financial art, the zero price is sometimes also referred to as a "discount factor", reflecting the fact that the zero price is less than one as long as the bond's yield is positive, consistent with the general experience with nominal interest rates. The length of the period from a bond's issue date to its maturity date is referred to as the bond's "tenor", although the term "maturity" is sometimes also used, when the context makes clear the reference is to the length of a period rather than to a specific maturity date. Accordingly, zero prices form a foundation for financial valuation. By establishing the price today for a fixed future payment on a specified future maturity date, with no payments prior to that maturity date, a zero price establishes the ratio between the value of the future payment today and the amount of that payment in the future. In the absence of arbitrage, as described below, this ratio must be the same for every zero coupon bond of a single issuer with that maturity date, and thus provides a procedure for determining the value today of any payment on that future date.

The value of a bond's future payments, determined by arbitrage methods as discussed below, need not be the same as the bond's market price, but if they differ, an arbitrage may arise. If arbitrage should arise, however, it is unlikely to persist in any significant size, for the following reasons. Suppose there is a zero coupon bond that pays $1000 at its maturity in ten years and sells at a price of $500 today. The zero price associated with this bond is $500/$1000, or fifty percent, equal to the ratio between the bond's current sales price and the future payment.

Were the issuer of the bond to promise to pay $2000 in ten years in a separate financial or commercial transaction, that promise must be worth $1000 today, determined as fifty percent of $2000, in the absence of arbitrage. An arbitrage transaction is one that offers the certainty or possibility of a receipt without the risk of a payment. If such a transaction becomes available, natural market forces will eliminate it. For example, suppose a bond issuer issued for $500 each a first class of bonds as above, each bond providing a single payment at maturity in ten years of $1000, and no other payments, and also issued for $1200 each a second class of bonds, each providing a single payment at maturity in ten years of $2000, and no other payments. Using short sales, a technique well-known in the financial art, a market participant may sell the latter bonds short and buy the former bonds, and thus create an arbitrage.

More specifically, a market participant may sell a bond of the second class short, raising $1200 in proceeds immediately but incurring an obligation to pay $2000 in ten years. That participant could then use $1000 of the $1200 short sale proceeds to purchase two bonds of the first class, assuring a receipt in ten years of $2000 for every two bonds purchased. The aggregate net consequences of the short sale and the purchase would be a receipt of $200 immediately per bond sold short and no net payment obligation at any time. This is an arbitrage: a receipt with no risk of any payment. Because a riskless profit is attractive, market participants would execute this transaction as much as they could. The effect of this activity by market participants would be to increase the price of the first class of bonds, by increasing demand through purchases, and decrease the price of the second class of bonds, by increasing supply through sales. The activity would cease when the price of the first class of bonds had risen and the price of the second class of bonds had fallen until the latter was exactly twice the former, since only in that event would arbitrage disappear.

Arbitrage is accordingly an unstable phenomenon, itself providing incentives for market participants to eliminate it. Moreover, the greater the riskless profit an arbitrage offers, the greater the incentives for market participants to act to eliminate it. It is therefore conventional in the financial art to assume the absence of arbitrage in analyzing market transactions. While this assumption is not invariably met, arbitrages offering significant profits rarely persist over significant periods, for the reasons described above, and financial professionals and informed private actors alike accordingly make assuming the absence of arbitrage a cornerstone of their analysis and decision-making. As described above, a bond's yield is inversely related to the bond's price; the higher the latter, the lower the former. Absence of arbitrage may thus be expressed as the equality of the yield of the two classes of zero coupon bonds of the same issuer with the same tenor described above. In the absence of arbitrage the two classes of bonds will have the same relationship between their price and their payments, in each case consisting of a single payment at their common maturity. In the simple case of a zero coupon bond, the relationship can be expressed by the zero price, the quotient of the price divided by the payment at maturity.

More broadly, two bonds of issuers of the same credit quality with the same payment terms, up to scaling by a constant to reflect the bonds' sizes, should generally provide the same yield in the absence of arbitrage since, should the yields differ, for example, the credit risk of one can be exchanged in the derivatives market for the credit risk of the other and an arbitrage then constructed in a similar manner to that described above. Two zero coupon bonds have the same payment terms, up to scale, if they have the same maturity date and the same payment on that date, since the maturity date is the only payment date.

Each credit class of issuers thus corresponds to a consistent series of zero coupon bond yields indexed by maturity, one yield for each maturity. Such a series of yields, or rates, is often referred to as a yield curve or rate curve and is graphically represented as a curve with maturities on the x-axis and yields on the y-axis. An interesting example of such curves are the forward curves and data available for the Euro zone at http://www.ecb.europa.eu/stats/money/yc/html/index.en.html. The curves and data include zero (spot) rates, par rates and instantaneous forward rates. In the ECB's Svensson model, the par rates are derived quantities.

There is an attractive source of yield information for bonds, well-known in the financial art as the interest rate swap, or just the "swap", market. This market has standardized terms and is very large, reported to be $342 trillion in notional amount as of June 2009. Although swaps are interest rate derivatives, not bonds, the rates in the swap market are considered to be reasonable indications of the yields on bonds with similar maturities issued by issuers with a strong credit rating, such as AA or Aa2 from Standard & Poor's and Moody's, respectively.

Swaps typically have maturities no less than one year, so for shorter maturities the source of yield information is a different type of interest rate derivative, known as Eurodollar contracts. The yields quoted on an instrument, such as a swap or Eurodollar contract, depend on several conventions, which may differ between different instruments. The yields associated with Eurodollar contracts thus need to be adjusted to make them comparable to the yields associated with swaps. Certain adjustments reflect the difference in "quotation basis", such as "Act/360" or "30/360" day counts, or conventions for business day calendars. Other adjustments are sometimes referred to as "convexity adjustments" in the financial art; for Eurodollar contracts with maturities less than a year these convexity adjustments are generally small.

A substantially complete yield curve may thus be constructed from the yields implicit in swaps and Eurodollar contracts together, the latter generally for maturities less than one year, the former generally for maturities one year or greater. An important issue remains, one well-known in the financial art. Swap rates (the term preferred to "yield" in the financial art in respect of swaps) reflect periodic payments, typically every six months in the United States markets, and one year in the European markets. Rates that are paid periodically are typically referred to as "par rates" because, in the case of bonds, such a rate is typically set at issuance at a level that will cause a bond carrying that rate to sell at its face, or "par", amount. A par rate thus corresponds to a market rate at origination. The more important quantities, however, are zero coupon prices and rates, which are equivalent, since the rate on a bond, including a zero coupon bond, determines its price, up to scaling for size, and conversely, as is well known in the financial art. As described above, from a practical perspective zero prices are the foundation of valuing any transaction, and from a more sophisticated perspective, they are fundamental to finding arbitrages. One result well-known in the financial art is that, subject to certain conditions, a transaction may be structured as part of an arbitrage if and only if that transaction has positive value based on appropriate zero prices. See generally Duffie, *Dynamic Asset Pricing* 31, cited above. Thus, many transactions, including complex ones, may be tested for arbitrage potential using zero prices.

Moreover, zero prices provide a means of computing "forward rates", the current market's assessment of the level of future rates. The use and derivation of forward rates is part of the financial art and will be discussed in greater detail below. As part of the financial art, these results are well-known and are described in many sources, including the reference materials cited above.

Zero prices and rates may be determined from par rates, which in turn may be observed in the market, justifying the use of the term "observables" to describe such market rates. The basic and well-known technique relies on the absence of arbitrage, and may be summarized as follows. Suppose there are two observable rates, a one year zero (coupon) rate of 5%, and a two year annual par rate of 10%. The par rate is not a zero rate, because the annual par rate represents a rate paid annually, once at the end of the first year and again at the end of the second year. However, a $100 long position in the two year par rate and a $9.52 short position in the one year zero rate, offsetting the first annual payment on the long position, has the net consequences of a derived (called "synthetic" in the art) $90.48 long position in a two year zero rate paying $110 in two years, resulting in an annualized derived zero rate of 10.62% and an associated derived zero price of $90.48/$110=82.25%. This computation is well known in the financial art. If there were an observable two year zero rate, that rate must, in the absence of arbitrage, equal the 10.62% rate derived above from the one year zero rate and the two year annual par rate. Were there a difference between the observed two year zero rate and the derived two year zero rate, an arbitrage could be created by shorting the lower rate and purchasing the higher rate, where the position in the derived zero rate would be established by establishing appropriate positions in the one year zero rate and the two year annual par rate. The existence of such an arbitrage would be profitable to market participants who identify it; these market participants would then act to eliminate the underlying difference between the two zero rates and thus eliminate the arbitrage. This analysis shows that an observable one year zero rate and an observable two year annual par rate may be combined to derive a two year zero rate, even were there no observable two year zero rate. If an observable three year annual par rate is available from the market, the observable one year zero rate, the derived two year zero rate, and the observable three year annual par rate may be combined in a manner similar to that discussed above, and well known in the financial art, to determine a derived three year zero rate, regardless of whether such a zero rate is observable in the market. This method of deriving zero rates and prices iteratively, sometimes referred to in the financial art as "bootstrapping", is effective where there are par rates observable on liquid instruments at each needed maturity, including each date on which a periodic payment is made on a par rate. This is seldom the case, however. For example, in the United States, par rate swaps and bonds typically provide for periodic payments, referred to as coupon payments for largely historic reasons, every six months. There are, however, few if any observable par rates on instruments with maturity an odd number of semiannual periods from the issue date of the associated instrument, and those that exist are too illiquid to make effective observables for these purposes. To be effective, an observable instrument must be traded with sufficiently liquidity that a market participant may establish long or short positions in that instrument in reasonable size without affecting the market through changing the rate or incurring undue cost. By way of illustration, in the United States liquid par swaps, and thus liquid par swap rates, exist with maturities of seven and ten years, but not with maturities of seven and one-half years, eight years or other intermediate annual or semiannual maturities.

There are a number of methods, all well-known in the financial art, for addressing the absence of observable par rates at all needed maturities, methods that permit derivation of complete par, zero and forward rate curves. The first and simplest method is linear interpolation of observable par rates to determine par rates for intermediate maturities. By way of illustration, if a seven year maturity par swap rate were six percent, and a ten year maturity par swap rate were twelve percent, the linearly interpolated eight and nine year maturity par swap rates would be eight and ten percent, respectively, and linearly interpolated par swap rates for the intermediate semiannual maturities would be determined similarly. The linearly interpolated eight and one-half year swap rate would be nine percent, for example.

While simple, linear par rate interpolation has certain infirmities, including those related to hedging with the resulting zero rates, the details of which are described in the literature related to the financial art. A more complex, but superior, interpolation method is referred to in the art as the "constant forward rate method". This method determines intermediate zero prices first, and from them then derives intermediate par rates. As with several other methods, the constant forward rate method uses "bootstrapping" and may be described by describing the iterative step to determine the zero prices for a longer maturity, once a par rate for the longer maturity and zero prices for all shorter maturities have been determined. This iterative step for the constant forward rate method may be summarized as follows in the context of zero prices previously determined for all relevant semiannual maturities not longer than seven years, and an observed ten year maturity par swap rate.

The following example determines annual rates, for simplicity. Accordingly, the observed ten year par swap rate is assumed to pay on each annual anniversary of the date accruals begin, known as the swap's "start date", from one to ten years. First, a brief description of forward rates is helpful. Ignoring certain technicalities not material here, a one year forward rate with an effective date of seven years is a rate for one year that accrues from the seven year anniversary of the date the forward rate is specified to a maturity date, referred to as the "termination date", one year after that seven year anniversary, which is to say the eight year anniversary of that specification date. The constant forward rate method is then as follows. Given zero prices with annual maturities of seven years or less that have previously been determined, the method picks any value (call it FR) for the one year forward rate with effective date of seven years. The constant forward rate method assumes that all three of the one year forward rates with effective dates from seven to nine years, one for each of the three intermediate annual intervals (i.e. seven to eight, eight to nine, and nine to ten years), are constant and equal to the same forward rate FR that was picked for a seven year effective date. Under this assumption, as is well known in the financial art, three zero prices may be derived from FR (the constant annual forward rate picked), one for each of the three annual maturities from eight to ten years, by repeatedly dividing each previous annual zero price by the quantity (one plus the annual forward rate) (i.e. 1+FR), starting with the seven year maturity zero price and dividing by this quantity repeatedly to derive the eight, nine and ten year maturity zero prices. As is well-known in the financial art, these must be the true zero prices if, as assumed, the annual forward rates are all constant and equal to FR. The three zero prices just computed for maturities from eight to ten years, together with the seven zero prices for maturities from one to seven years (which were by assumption previously determined), provide a complete set of ten zero prices at all annual maturities from one to ten years. These ten zero prices may be applied to compute the present value of the payments on a par bond of appropriate credit quality with a ten year maturity and ten annual coupon payments at the observed ten year par swap rate, together with the principal payment at such a bond's ten year maturity date. Because the ten year par swap rate was observed in the market, and thus represents a market par rate for such a bond, the bond must have a market price, and thus, in the absence of arbitrage, a present value, of par, equal to its face amount.

This condition that such a bond's present value must equal its par amount imposes a condition on the annual forward rate FR, and there is generally a unique forward rate that satisfies this condition, which may be determined by Newton's method or other iterative, closed-form or other procedure well known in the computational art. This method of deriving zero prices for annual maturities from eight to ten years, given zero prices for earlier maturities and an observed ten year par rate, is sometimes referred to in the financial art as the "constant forward rate" interpolation method. The par rates with annual maturities from eight to ten years may then be derived from the zero prices, because bonds with those par rates and associated maturities must have a present value of par based on those zero prices. This computation is also well-known in the financial art. Sample pseudocode illustrating the constant forward rate interpolation method in the context of one of the currently preferred embodiments of the present invention appears at E] SAMPLE CODE EXCERPTS, below.

Similar arbitrage principles apply to establish relationships between (a) "forward" prices, rates and spreads with respect to equities, commodities, foreign exchange and credit, and (b) the current market, or "spot", levels of such prices, rates and spreads. For example, the "forward price" of an asset for delivery on a specified future settlement date is the price to which parties would agree today, based on current market levels, for delivery and payment on the future settlement date. One example is the forward price for commodities into hedging contracts into which commodity producers enter to manage the price risk of the commodities they produce. Very generally, in the absence of arbitrage (a) the forward price for any tradable asset should equal (b) the asset's current market price, plus the sum of (i) interest compounded through the forward delivery date and (ii) any costs ("carrying costs") required to hold the asset, minus (iii) any income from the asset. By way of illustration, in the case of the commodity oil, carrying costs should include storage costs. In case of equities, income from the asset should include dividends. In the case of foreign exchange, the income from the asset may comprise the interest payments on a foreign-currency denominated bond.

In broad outline, the justification for this relationship between forward and current market prices is that, should (a) and (b) differ, market participants may obtain riskless profits by purchasing or selling short the physical asset (purchasing or selling depending on the sign of the difference), until the specified future settlement date, financing the purchase with, or investing the short sales proceeds, in interest bearing debt, while also paying any carrying costs and receiving any income.

Similar relationships, based on more complex justifications, apply to options, swaps and other derivatives on tradable assets. The absence of arbitrage thus provides a general basis for pricing many derivatives on tradable assets and related quantities such as rates. These relationships and their justification are well-known in the financial art.

As indicated above, the derived zero and other prices and rates provided by certain of the present invention's currently preferred embodiments offer valuation procedures that assume the absence of arbitrage. However, where that assumption does not hold, these procedures provide users of these embodiment means to identify arbitrage, thus providing the even greater benefit of identifying transactions offering potentially riskless profits.

SUMMARY OF THE INVENTION

To ameliorate the problems that affect private systems and other systems under prior art, the present invention includes several elements that are new to the art, with the objectives of providing a system that provides low-cost, comprehensive benchmark and developed rate curve information, and other information and services, that is timely, reliable, accessible, consistent and transparent. Certain embodiments provide additional methods in connection with this information.

These and other objectives of the present invention are achieved in certain embodiments by methods for acquiring information, such as market information, and deriving and otherwise developing other information from that information, and providing the original information together with the developed information to users, along with, in certain of these embodiments, methods to analyze that information and use that information in additional useful processes.

Embodiments of the present invention provide information which financial market participants and others entering into transactions with financial consequences need in order to make timely, accurate and effective decisions, including with respect to the management of their investments, loans and other financial positions. Users of the present invention include sophisticated individuals and financial institutions, large and small companies needing to finance their activities and manage their activities, and small retail investors and borrowers.

Current exemplary embodiments of the present invention include a host computer system with processes and executable code modules for 1. acquiring information, such as recent financial data, from one or more external electronic sources,
2. receiving and storing information, including
   a. the information acquired from external sources, and
   b. requests and information from users, such as registration and subscription requests, agreements, account configuration requests, financial transaction terms and data for valuation purposes, and other information,
3. decomposing the acquired information into component information, such as individual prices, rates, dates, descriptions or other information units,
4. processing, enhancing, interpolating, extrapolating, extending, deriving and otherwise developing additional or modified information from the acquired information, for example, other prices or rates for different dates, or that are otherwise not included in the original acquired information, and compiling, tabulating and/or graphing any financial or other data, including acquired data and any developed data,
5. formatting, displaying, distributing, sending or otherwise transmitting the original acquired information and the developed information, possibly with graphs or charts, to users or users' systems, or other persons at the request of users or otherwise, in the form of an Internet webpage or other general distribution, or a direct transfer to the user, such as by email, file transfer, webservices or by other transmission or distribution method.

Exemplary Embodiments May Also Include 1. communications and I/O infrastructure means for users to access and communicate with an embodiment's host computer system, including sending and receiving information, through computers, telephones or other user devices, over one or more networks, such as a telephone or other telecommunications network or a computer network such as the internet,
2. means for valuing or otherwise analyzing transactions based the original and developed information the embodiment acquires and derives, and on transaction terms and other information transmitted to the embodiment by users through such communication and I/O means, and
3. support infrastructure for administering the embodiment largely automatically with minimal supervision, such as by scheduling a program to run on the system automatically at a specified time each day, each week, or other period, or on specified dates or times, which program will acquire the most recent information from the relevant external sources, process and develop it, and distribute or otherwise make available the resulting original and developed information to users that have requested it, without further action by an administrator or other further administration.

Certain embodiments of the present invention include one or more of these components/steps as part of systems/processes that are wholly or partially new to, or represent improvements over, existing art, or are combined in new or improved ways relative to existing art. These components/steps, by themselves or when combined with other components/steps, offer significant practical and useful advantages over existing art to users of financial information. One such advantage is dramatically reduced expense of providing the desired information. As discussed below, there are many other advantages as well.

The variety of financial instrument pricing models, including option pricing models, in the financial art is extensive and well-known. The selection, specification and use of these models are extremely technical and specific to particular circumstances, including market conditions and terms of particular instruments. Embodiments of the present invention accordingly provide several useful methods for valuing financial instruments, while also providing the comprehensive market data and related developed data that such detailed and specific pricing models require, thus allowing users with strong preferences for particular models to use those models to derive customized valuation.

These embodiments may also include modules to acquire market data from currently existing external sources, and modules that process the acquired market data to develop complete par, zero and forward curves that are free of arbitrage, as described below. Certain of these embodiments provide additional modules for users (a) to modify the acquired market data to reflect, for example, user estimates of credit spreads, and (b) to reprocess the modified market data to redevelop complete curves reflecting these modifications. These modified curves are also arbitrage-free. Certain of these embodiments provide valuation modules that value transactions, the terms of which users may specify, based on these complete curves. Certain embodiments also provide modules that obtain transaction terms automatically from other external sources, such as from FINRA's TRACE systems, based on CUSIP numbers or security symbols.

In light of the above, generally speaking, and without intending to be limiting, one aspect of invention involves financial information/analysis systems that include, for example, at least a computer-readable memory containing at least the following computer-executable objects: a CurveMaker object, configured to receive one or more Uniform Resource Locator(s) (URL(s)), each corresponding to a webpage, and generate one or more rate objects by instantiating a RateTable object for each URL; each instantiated RateTable object configured to invoke a getData( )method to obtain data from the webpage or a local copy thereof, utilize regular expression scanning to ascertain header and tenor information therein, utilize said ascertained header and tenor information to decode numerical rate information therein, and associate said decoded numerical rate information with a plurality of rate subclasses; said plurality of rate subclasses including at least a ConstFwdRate subclass and a LinearParRate subclass, the ConstFwdRate subclass used to hold rates, including zero prices and forward rates, calculated by constant forward interpolation, and the LinearParRate subclass used to hold linearly-interpolated rates, including par rates and bootstrapped zero rates. Such systems preferably further include at least one Internet-connected server, configured to execute said CurveMaker object. At least one of the webpages may include Federal Reserve H.15 data and/or European Central Bank (ECB) data, typically formatted for reading by a human, rather than a computer. Such systems may further include a webserver configured to (1) execute said CurveMaker object, (2) utilize rate information computed by said CurveMarker object to evaluate an investment vehicle, and (3) report results of said evaluation via the Internet. The investment vehicle may include a bond, a stock, an interest rate swap, or a portfolio containing these and other instruments. Such systems may further include (4) means for manually modifying or overriding numerical rate information decoded by the getData( )method, and (5) code for reevaluating the investment vehicle using the manually modified or overridden data. Alternatively or additionally, such systems may further include (4) means for manually modifying or overriding numerical rate information decoded by the getData( )method, and (5) code for reevaluating the LinearParRate and/or ConstFwdRate subclass(es) based upon the manually modified or overridden numerical rate information.

Again, generally speaking, and without intending to be limiting, another aspect of the invention relates to method for computing financial information by, for example, instantiating a CurveMaker object in the memory of an Internet-connected server, the CurveMarker object configured to receive one or more URL(s), each corresponding to a webpage, and generate one or more rate objects by instantiating a RateTable object for each URL; each instantiated RateTable object configured to invoke a getData( )method to obtain data from the webpage or a local copy thereof, utilize regular expression scanning to ascertain header and tenor information therein, utilize said ascertained header and tenor information to decode numerical rate information therein, and associate said decoded numerical rate information with a plurality of rate subclasses; said plurality of rate subclasses including at least a ConstFwdRate subclass and a LinearParRate subclass, the ConstFwdRate subclass used to hold rates, including zero prices and forward rates, calculated by constant forward interpolation, and the LinearParRate subclass used to hold linearly-interpolated rates, including par rates and bootstrapped zero rates. Such methods may further include receiving, over the Internet, an instruction to execute said CurveMaker object. At least one of the webpages preferably includes Federal Reserve H.15 data and/or ECB data, typically formatted for reading by a human, rather than a computer. Such methods may further include (1) using rate information computed by said CurveMarker object to evaluate an investment vehicle, and (2) reporting results of said evaluation via the Internet. The investment vehicles can include bonds, stocks, or any portfolio of these and other instruments, securities, or payment streams. Such methods may also include (3) manually modifying or overriding numerical rate information decoded by the getData( )method, and (4) reevaluating the investment vehicle(s) using the manually modified or overridden data.

BRIEF DESCRIPTION OF DRAWINGS

Aspects of the present invention and embodiments thereof are illustrated in the accompanying set of figures, which is intended to be read in conjunction with the summary and detailed description that follows, and in which:

FIGS. 7B and 7C show a download of the same swap rate data shown in FIG. 7A, available to registered users by email or other distribution, in comma-separated format suitable for spreadsheet use. The complete data for the swap curve developed through Constant Forward Rate interpolation is shown.

FIG. 8 shows a portion of the current US Treasury rate curve webpage from that embodiment, available to registered users.

FIG. 10 shows a portion of a current interest rate curve customized by a user on a webpage from that embodiment, an example of a custom rate curve.

FIGS. 14A through 14C show a h15 page from the US federal reserve in text format that the embodiment may use as an information source.

FIGS. 15A through 15C show a h15 page from the US federal reserve that has been converted from HTML to text format by that embodiment and may be used as an information source.

DETAILED DESCRIPTION

In certain of the currently preferred embodiments, the new elements the present invention provides relate to one of more of the following modules, which in different embodiments may be separate or combined, or split into one or more modules or submodules, or expressed as classes, subclasses, or functions, or other process units or subunits. Here, for ease of exposition, the indicated elements of the embodiment have been described as distinct and unitary modules. As used herein, the term "data" includes data and/or other information, such as text representing news or descriptions. Accordingly, the currently preferred embodiments may include one or more of the following modules:
1) Data acquisition modules, FIG. 3, 215
2) communication module(s), FIG. 1, 20, 30, 40
3) decomposition module(s), FIGS. 3 and 4, 220, 308-360
4) data entry and modification module(s), FIG. 3, 225

Figure 3:
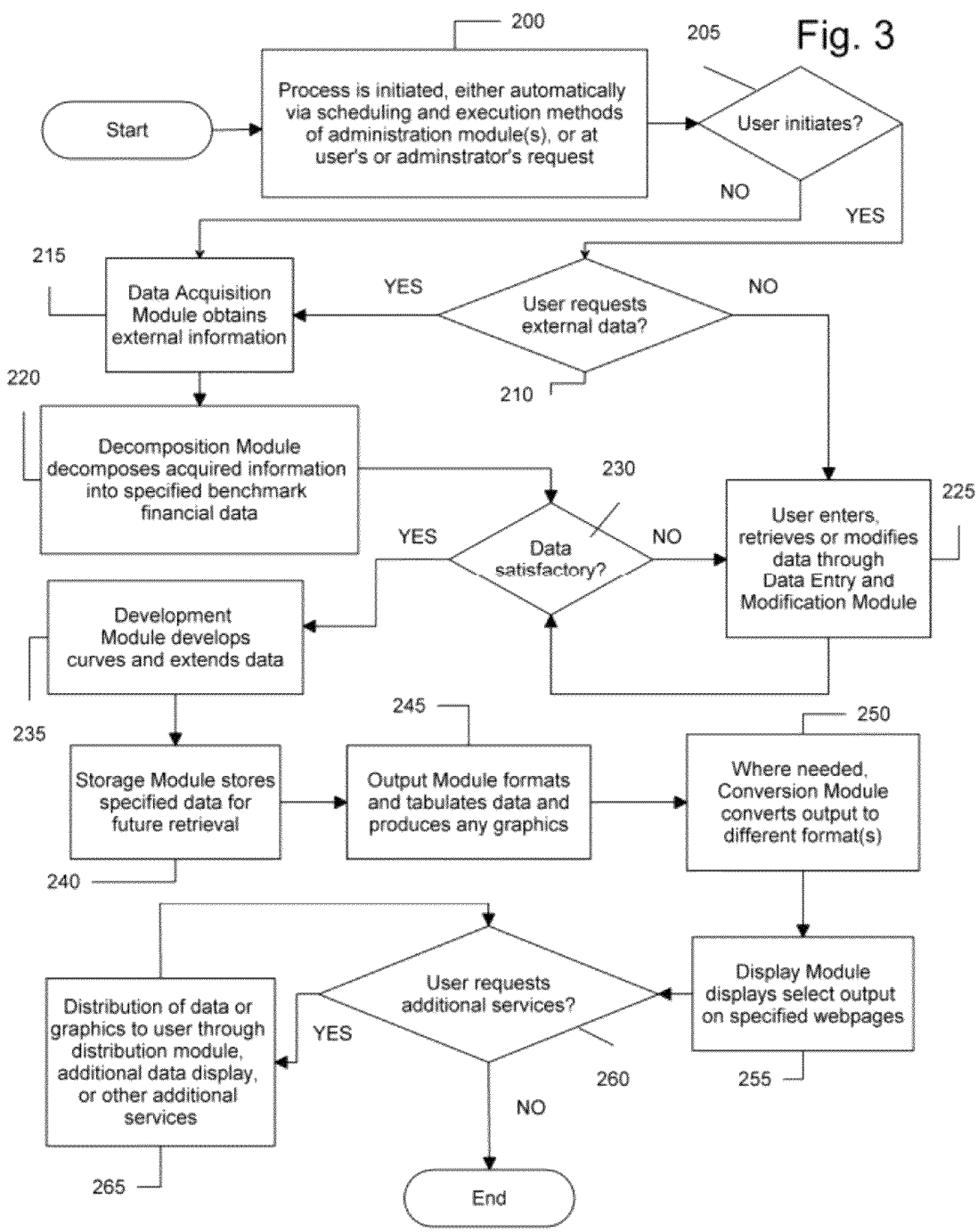
FIG. 3 is a flowchart showing for an exemplary embodiment the data acquisition and development processes, together with the data modification process and the output and distribution processes, including the distribution of valuation or other services a user may request.
Figure 4:
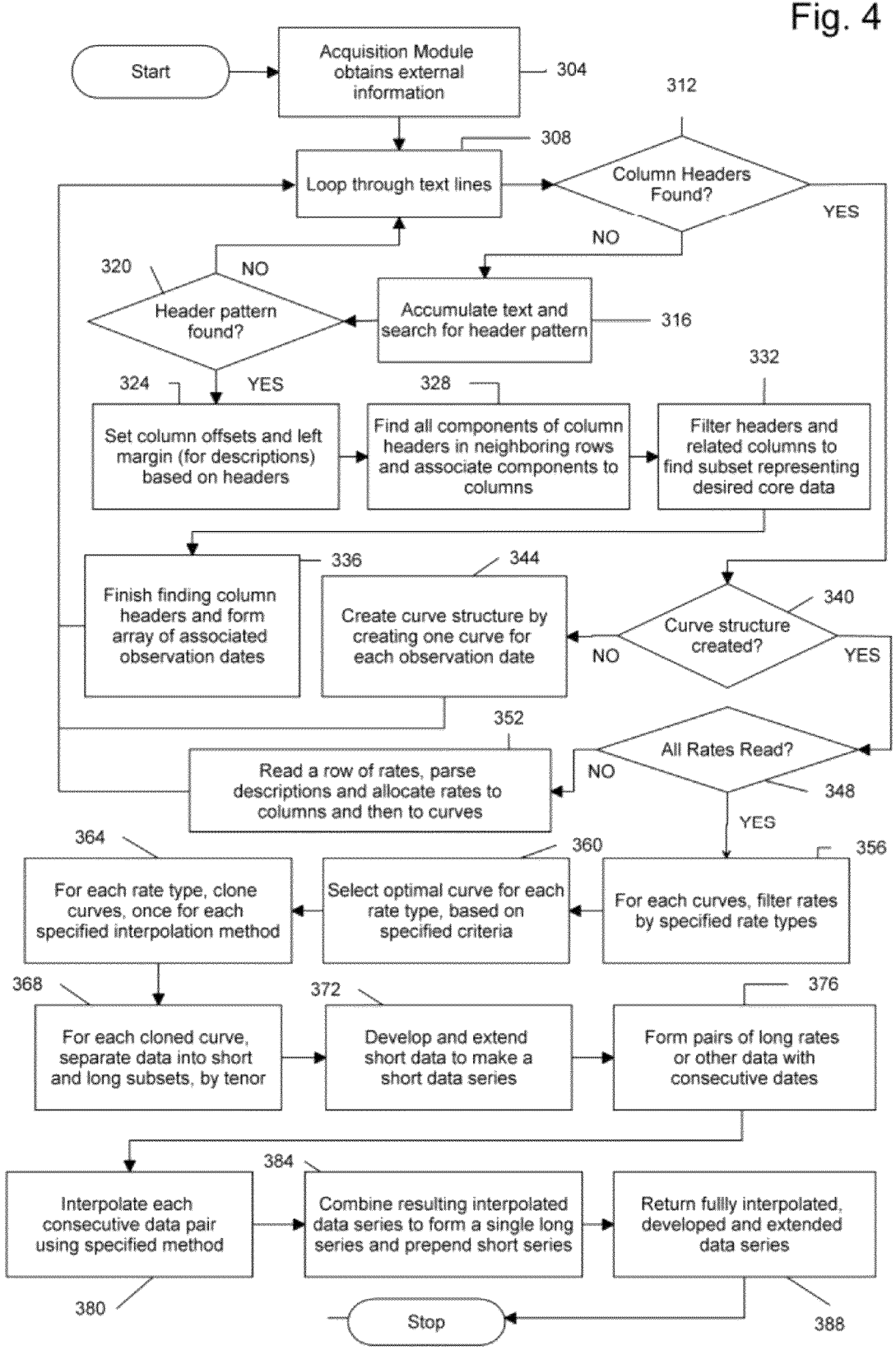
FIG. 4 is a flowchart showing for an exemplary embodiment the data acquisition and development processes in greater detail, including the decomposition process to decompose the data acquired into separate rates or other data units and an interpolation process to develop and extend the data units.
Figure 5:
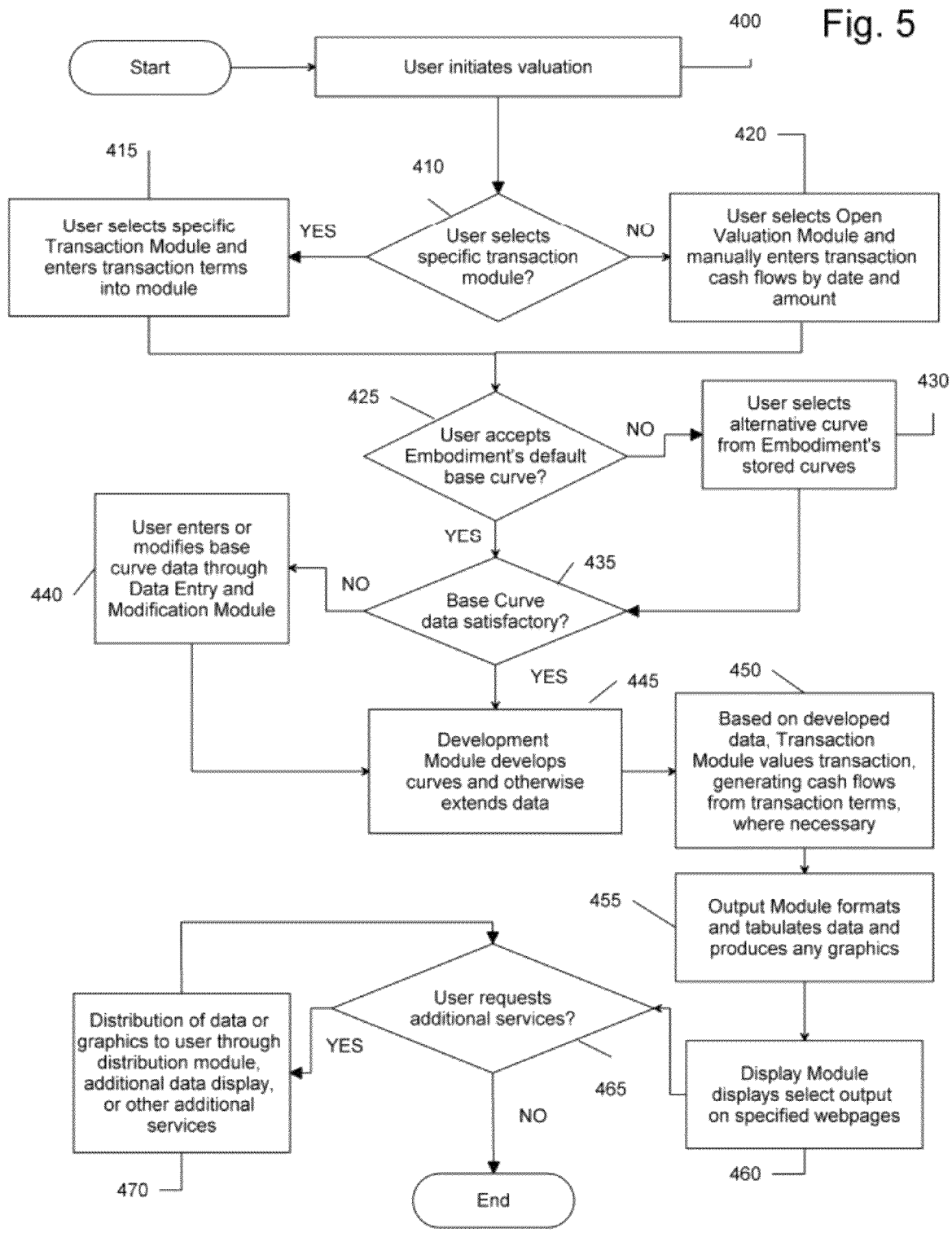
FIG. 5 is a flowchart showing for an exemplary embodiment the transaction valuation and analysis processes, including the selection of a specific or general valuation method, the selection and development of the base curve to be used for transaction valuation, together with the output and display of the results, and optional additional services such as analysis of a transaction's risk.
Figure 13:
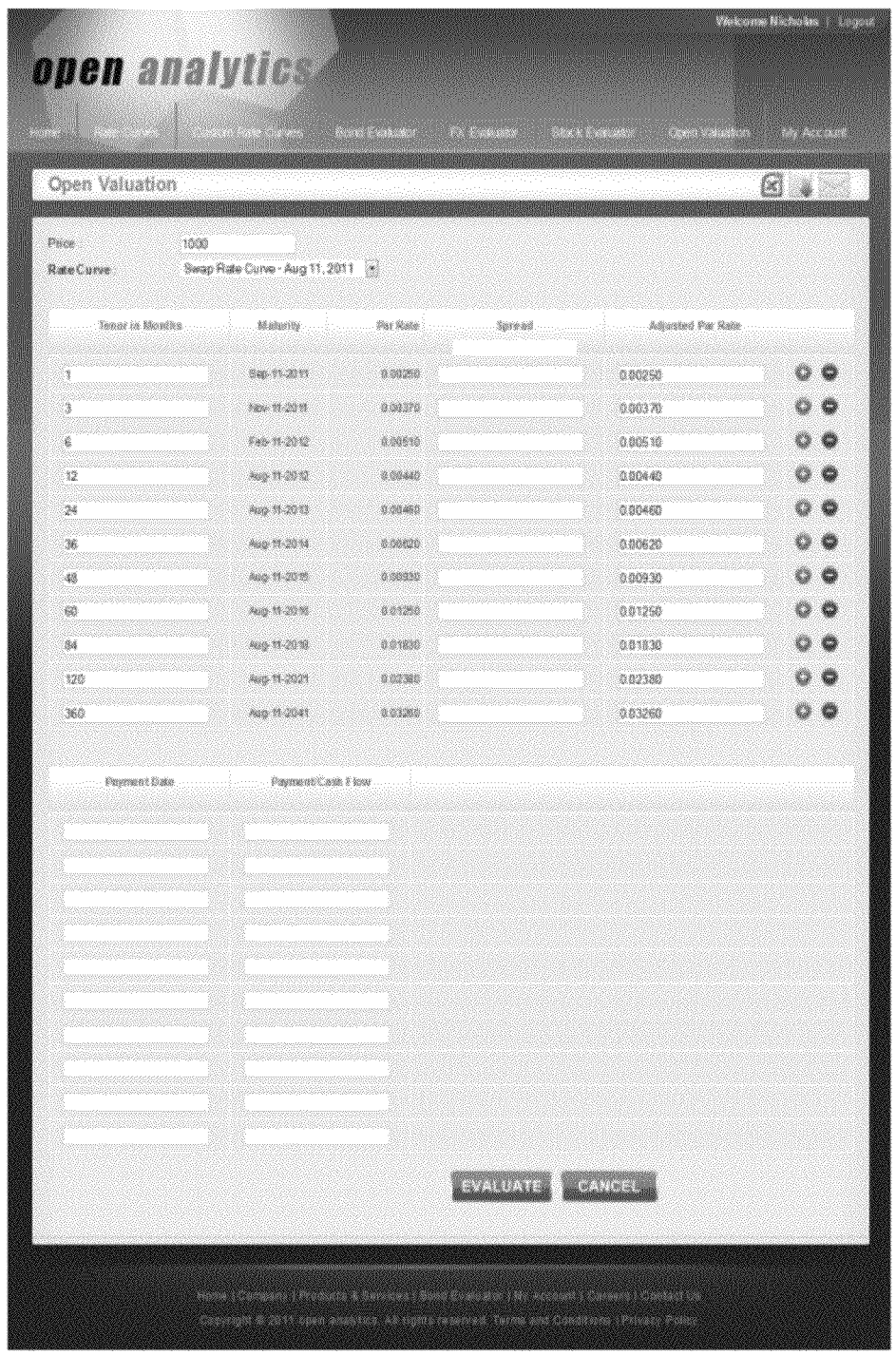
FIG. 13 shows the open valuation webpage from that embodiment.

5) data development module(s), FIGS. 3 and 4, 235, 364-388
6) comparison module(s), FIG. 3, 245
7) valuation and analysis module(s), FIG. 5
8) output module(s), FIG. 3, 245
9) conversion module(s), FIG. 3, 250
10) display module(s), FIG. 3, 255
11) distribution module(s), FIG. 3, 265
12) storage and retrieval module(s), FIGS. 3, 240, and
13) administration module(s). FIG. 3, 200

As described in greater detail below, certain of these modules represent entirely new elements, others include partially new elements, others represent existing art implemented and combined in whole or part in a new way or ways, and the remainder represents existing art. Because the present invention's design is independent of any user's private system, the modules may operate over the internet, over a private network such as an intranet, or over another network.

Figure 1:
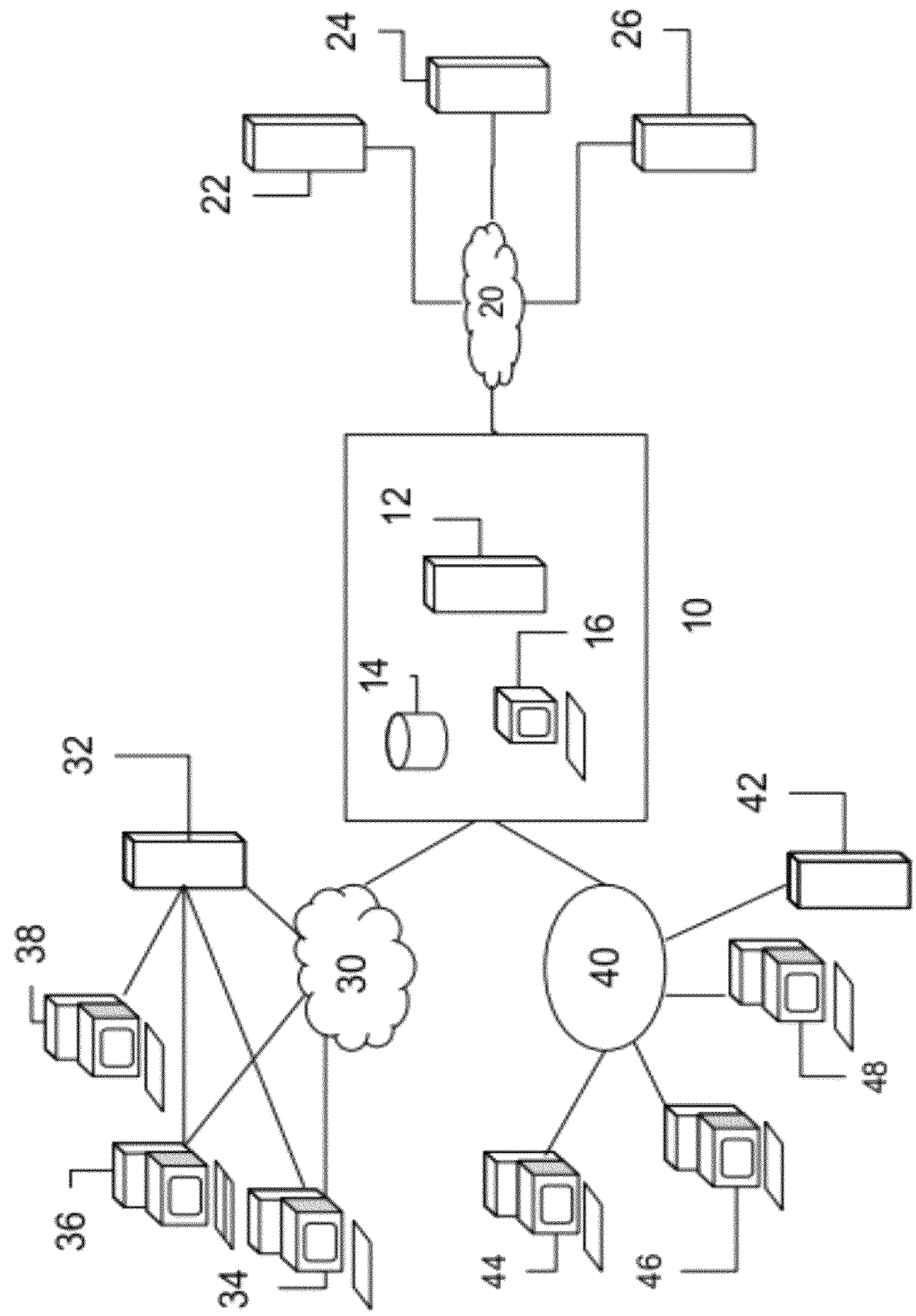
FIG. 1 is a schematic diagram illustrating an electronic information and analysis system according to certain embodiments of the present invention that include one or more separate computer systems partially or wholly distinct from a user's computer system.

FIG. 1 illustrates an electronic information and analysis system according to certain embodiments of the present invention that include one or more separate computer systems partially or wholly distinct from a user's computer system. (In other embodiments, the information and analysis system could be installed in a user's computer system.) The embodiment's information and analysis system includes a computer system 10 which could include one or more servers or other computers or processors 12, database servers or other storage 14, monitors, keyboards or terminals for administration 16, or other computing, storage, input/output or other devices. This computer system includes computer software for information acquisition, decomposition, processing, development and distribution, which provides one or more of the methods of embodiments of the current invention. Certain embodiments also include computer software for analysis. The system 10 could be located as one unit or multiple units within a single location or multiple locations.

The system 10 and the information and analysis software on the embodiment's processors or other computing devices can be configured to communicate with user devices, including computers, computer systems or cellphones, within a local area network (LAN) 40, or over a wide area network (WAN) 30, such as the internet, or a cellphone, telephone or other network, with or without security. In a WAN, a server might intermediate between a user's computer and the embodiment's system, 32 and 38, or the user's computer or other device might connect directly, 34 or 36. Such communication may occur over the internet, over a wired or wireless network or over any other computer, telephone or other telecommunications network. The communication method may include any of the communication protocols or other methods known in the computer or telecommunication arts, whether in connection with a graphical user interface or otherwise, including http, https, FTP, SFTP, EDI, IVR, electronic messages such as e-mail, or proprietary communication protocols. In certain embodiments, communication may include fax or physical delivery such as traditional mail or by courier, or by other delivery means well-known in the art.

A communication protocol is established between the embodiment's computer system 10 and the user's devices or systems 30 through 38, in the case of a WAN, and 40 through 48, in the case of a LAN. In either case, a user's system could include servers 32 (WAN) or 42 (LAN), computers 34 through 38 or 44 through 48, respectively, or any other receiving, sending, computing, storage or input/output devices. User devices, systems and components 34, 36, 38, 44, 46 and 48 in various embodiments could include personal, laptop, desktop or tablet computers, phones, including smartphones, or servers, 32, 42, including database servers, operating independently or within a user's network, for users who access the embodiment using a user network.

The embodiment's system 10 communicates with the user devices 30 and/or 40 to receive registration information, and thereafter credentials for system access, to receive data or other information and requests for configuration, and to send or otherwise distribute information or analysis, such as developed information or valuation information, as webpages, files, emails, text messages or otherwise. One or more of user devices or other components 32, 34, 36, 38, 42, 44, 46 and 48, including any user networks, may access the embodiment through the communication protocols for which the embodiment was configured, and may further configure the system to specify the types of information, including specifying certain information sources, certain distributions of information to be received, including periodic information distributions such as daily interest rate curves, certain analysis, such as valuation of financial transactions, and other information and/or analysis or other services.

To acquire data, the embodiment's system 10 also communicates with data sources, including third party webpages and databases, specified by the system or by a user, 22, 24 and 26, over the internet 20 or other communication method, through any of the protocols or other methods well-known in the computer or telecommunication arts, such as a hypertext transfer protocol http, https, FTP, SFTP, EDI, or, alternatively, through a specified proprietary communication protocol. The embodiment's computers or other processors 12 process the acquired information to develop information for distribution to users, 30, 40, or storage 14 for future use.

Many other examples are possible and apparent to those skilled in the art in light of this disclosure. Thus, the example of a system in FIG. 1 according to the present invention is not to be considered limiting.

Figure 2:
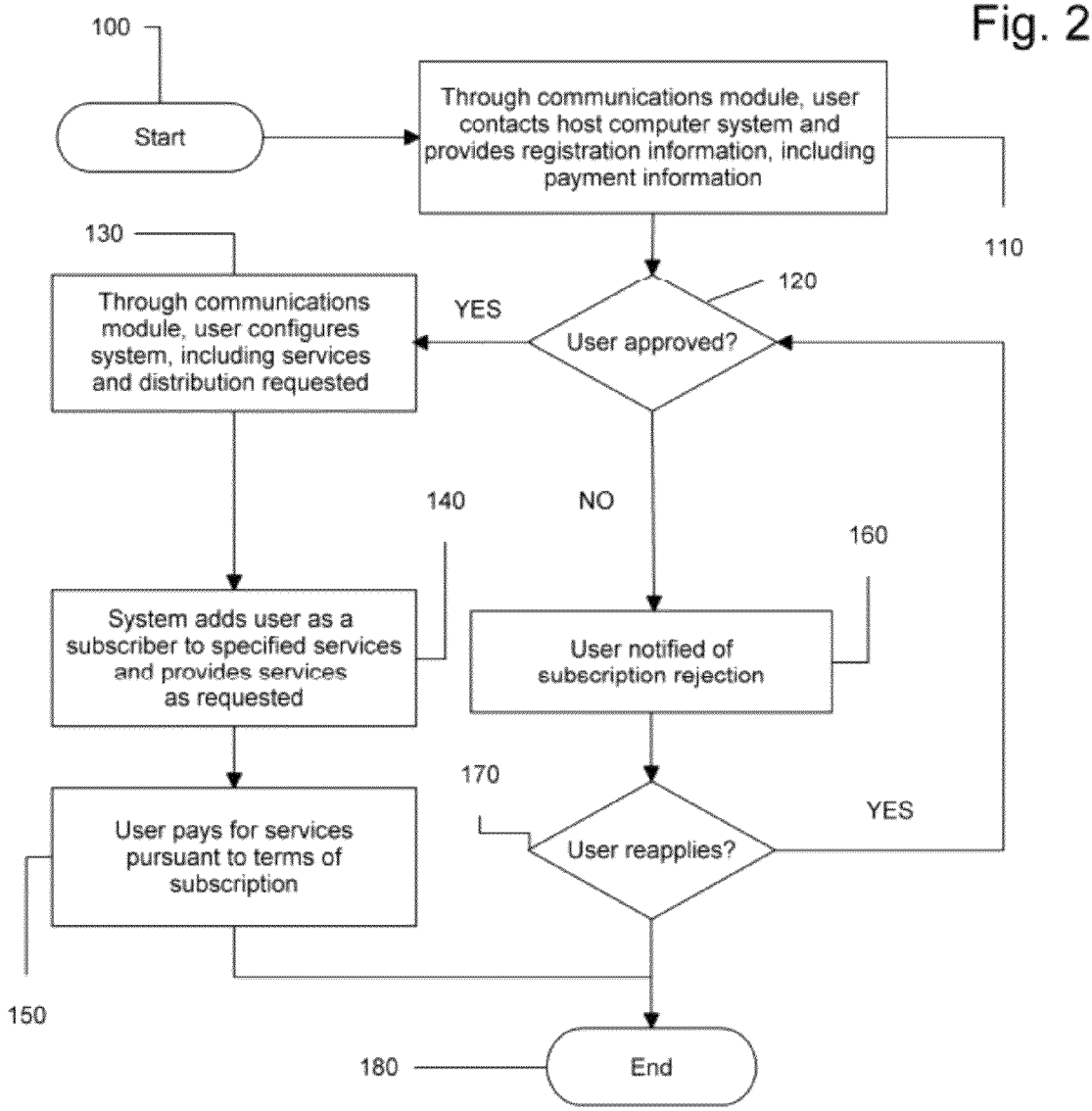
FIG. 2 is a flowchart showing the registration of a user for selected services according to an exemplary embodiment.

FIG. 2 is a flowchart showing the registration process for a user of an exemplary embodiment for selected services from that embodiment, including the user's subscription for those services after registration. In one exemplary embodiment, this process could occur through the home page shown in FIG. 6. A user begins 100 by contacting the embodiment through one of the embodiment's communications modules 110 and initiating registration and subscription by providing registration and payment information. If user is rejected 120, user is informed of the rejection 160 and given the opportunity to reapply 170. If user is rejected and does not reapply, the process ends. If user is approved, user selects and configures the services user wishes 130, including the forms of data distribution, such as by webpage, email or text to handheld device. In certain embodiments, a user may also specify information sources or otherwise configure features of the embodiment.

The system stores the user's data and service selection, and provides services as requested 140, and the user pays for selected services 150, completing the registration and subscription process 180.

FIG. 3 is a flowchart showing, for an exemplary embodiment, an overview of several of the embodiment's processes, including the data acquisition and development methods, the data modification methods, and the output and distribution methods, including valuation methods or other services that a user may request.

The process may be initiated 200 by an administrator or a user, or automatically, through an administrative module that schedules the process to execute on specified dates, times, periods or events. Events that would automatically initiate this process could include the availability of updated data monitored by the embodiment or by an administrator, such as more recent interest rate or stock price data. Initiated automatically or by an administrator, the embodiment obtains external data from one or more local or remote information sources specified in its configuration, including default sources, 215 and adds the new information to its stored information. In certain embodiments, remote information is sought if local sources are found to be inadequate.

If a user initiates, 205 the user may retrieve data the embodiment previously stored, or obtain data from external sources, 210 modifying the data if the user so wishes, or may enter new data directly, in each case through the embodiment's data entry and modification module. 225 User modifications may include addition of credit spreads for a specific issuer or a class of issuers, which, in certain embodiments, may be obtained by the embodiment at the user's request. The user reviews the data to confirm it is satisfactory. 230 If the data is unsatisfactory, the user may enter new data or modify existing data until the data is satisfactory.

Once satisfactory data is obtained, the embodiment's decomposition module decomposes the subject data into its component information units, as described in greater detail in FIG. 3, 312-356. As described in greater detail in FIG. 3, 360-388, the development module develops and extends the data previously acquired.

The embodiment stores acquired data, and in certain embodiments may store developed and extended data, for future use by users. 240 The output module organizes, formats and otherwise processes the acquired and developed data, and in certain embodiments may produce charts and graphs. 245 Certain embodiments include a conversion module to convert data, charts and graphs into alternative formats, such as converting a chart in SVG format to a PNG format, for ease of display or distribution. 250 The embodiment's distribution module contains a display module to display the resulting data, including any charts or graphs, in specified webpages that users and others may view. 255 In certain embodiments, users may request or subscribe for additional services from the distribution or other modules. These services may include data distributions, requests for additional data or additional computations, including comparisons among the data, such as spreads between rates or across time, or valuation, including computation of prices and rates for specified transactions based on information provided by the user and/or the information acquired or developed by embodiment, or identification of certain conditions arising in the data, such as rates or prices rising above or falling below specified thresholds. Certain of these services may require additional payment. These embodiments provide such services, including, if applicable, distributing data, charts or graphs by email or other distribution mechanism. 260, 265 Thereafter, the processing stops.

In greater detail, the data acquisition module for the embodiment shown in FIG. 3, 215, obtains data or other information, in text, numeric, HTML, XML or other structured or unstructured format, compiled by or obtained from one or more third-party sources, such as, by way of illustration, US dollar interest rate data on the United States Federal Reserve's daily H15 page, available at http://www.federalreserve.gov/releases/h15/update/h15upd.txt or Euro interest rate data available on the European Central Bank statistics page, http://www.ecb.europa.eu/stats/money/yc/html/index.en.html.

Through one or more communications modules, described below, this module obtains data from the specified source or sources and downloads, copies or otherwise transfers the data to one or more of the machines associated with the embodiment. See E]SAMPLE CODE EXCERPTS 1 E] 1 below, "Acquire Data From WebPage". In certain embodiments, the module may first check whether the needed data exists locally, and only acquire data from remote sources if it does not. The module may include selection means for a human user to select the sources from one or more menus, or specification means for a user to specify and enter new sources of data.

In certain embodiments, the data acquired comprises market rates, prices or other levels in respect of one or more classes of transactions, such as ten-year interest rate swaps, that are executed in sufficient size, with sufficiently liquidity and otherwise with characteristics to be considered reliable benchmark transactions. The liquidity and other characteristics suggest that the benchmark levels reliably represent the market for similar transactions at the time the levels were observed. Accordingly, rates or other levels for other transactions for which there is no comparably liquid market may be developed from levels for benchmark transactions with approximately similar terms. For example, in the US, the rate on a six and one-half year interest rate swap, a tenor for which the swap market is not very liquid, should be somewhere between the rates on a five year and a seven year interest rate swap, and generally closer to the latter. Because the markets for such five and seven year swaps are liquid, the rate for a six and one-half year interest rate swap interpolated or otherwise developed from contemporaneous rates on five and seven year swaps should generally be a more reliable indication of the market rate for a six and one-half year swap than an actual contemporaneous rate observed on a six and one-half year swap. The market for such a swap is sufficiently illiquid that an observed rate may well be unrepresentative.

The second module, a communications module, provides in certain embodiments means
  a. to receive communications from users, FIG. 1 30, 40, including
    1. requests for registration as a user and related registration and user information, including identification and contact information and any payment information, FIG. 2, 110,
    2. requests for services such as data distributions, FIG. 2, 130,
    3. information configuring those services, such as specifying any external information sources, FIG. 2, 130, and
  b. to obtain information for the data acquisition module, FIG. 3, 215, and
  c. to distribute data and information acquired or developed by the system to users or to others, such as over the Internet as a webpage, or by email or through a file transfer protocol, or over a private, local or other network. FIG. 2, 140; FIG. 3, 255, 265.

FIG. 4 is a flowchart showing for an exemplary embodiment the data decomposition and data development modules, FIG. 3, 220, 235 in greater detail, including the process to decompose the data acquired into separate rates or other data units and an interpolation, extension and development process to extend and develop the data units. The decomposition module shown for an exemplary embodiment in FIG. 4 provides programming identification means to identify the structure in the data acquired by the data acquisition module and decompose it into its component information units, including by parsing the data into tokens, which may represent items of data. If multiple data sources are provided, the programming identification means identifies the structure in the data from each source separately, and then aggregates the resulting components, for example, to form a plurality of rate curves, each curve from one or a plurality of the sources.

Identified structural data information units may include words, dates or numbers, such as
  1) the date a particular item of data is observed,
  2) the date that item is reported,
  3) the tenor or maturity date of financial instruments the data describes,
  4) textual descriptions of these instruments,
  5) the type of the instruments, such as bonds or swaps, and
  6) the price or rate of these instruments.

In certain embodiments, the identification methods provide means to identify structural information units by identifying an implicit table structure from data comprising text without explicit structure. See E] SAMPLE CODE EXCERPTS, E] 2 through E] 6 below, "Column Header Identification" through "Rate Identification and Parsing". To identify patterns in text, such as those indicative of tables or other data structures, embodiments may use "regular expressions" or other pattern matching techniques well-known in the computer programming art. Identification means may include means to separate the source text into columns, each column representing, for example, instruments observed on a single date. In certain embodiments, the separation means begins with conversion of a HTML table to text with column delimiters. In other embodiments, the source data is provided in XML according to a specified schema, which is then used to identify the data and thus columns.

Parsing of unstructured text comprises steps that may include one or more, or all, of the following. Certain embodiments' decomposition methods include means for parsing unstructured data comprising an implicit table structure containing rates or prices observed on different dates corresponding to different columns. FIGS. 14A through 14C contain an example of such data. The description below of these parsing means includes notes on simplification possible in the event of HTML, XML or other structure on the data. FIGS. 15A through 15C contain an example of unstructured data converted from such data to have column delimiters and indentation indicators.

Having acquired information, FIG. 3, 215, the decomposition process shown in FIG. 4 for textual data acquired by the exemplary embodiment includes some or all of the following steps.
  1) Loop through the lines in the acquired text, 308 searching for one or more lines that may comprise column header, rate, price, tenor, observation date, reporting date or descriptive information, or other information. 312 Certain information, such as potential column headers or other descriptive information, may be accumulated when appropriate across neighboring lines of text. 316 Continue looping through the text lines until a sequence of neighboring lines exhibiting the specified character patterns is found.
  2) Identify individual column headers by reference to specified patterns 320 in the current line text and text accumulated from neighboring lines, such as
    a. line text including year references, the text of such references comprising a pattern such as four digits,
    b. nearby line text including references to months, the text of such references comprising a pattern such as a string comprising one or more letters indicative of month names,
    c. other nearby line text including references to days of said months, the text of such references comprising a pattern such as one or two digits, d. in each of these cases, multiple references being separated within a single line by one or more spaces, or, in the case of HTML or other structured data, explicit field delimiters, and e. possibly other additional identifying information indicative of column headers in the text of said lines.

According to certain embodiments, these patterns are specified wholly or partially by one or more regular expressions, which are characteristic of lines that comprise the column headers for a table. See E] SAMPLE CODE EXCERPTS, E] 2 below.

3) Having found a line or lines with column header information, select one or more of those lines, and identify the offset of each column header from the start of that line or lines. 324 For text data with no external structure, as in FIGS. 14A through 14C, the offset could be the number of character spaces from the beginning of the relevant line to the beginning or middle of the specific header text, such as a month reference. If the data benefits from a HTML or XML structure, or has been converted from such a structure to text with explicit column or cell delimiters and indentation indicators, as in FIGS. 15A through 15C, this structure may determine offsets, such as by identifying the column number from an appropriate tab attribute or by counting the number of delimiters from the row's beginning to determine column or cell placement within a row. For headers spanning multiple lines with different offsets for a single header, embodiments may use the mean, the mode or the median offset, or use other decision criteria known in the art.

4) The first offset for header information found above will typically be greater than zero, identifying the left margin, or, equivalently, the first column at zero offset. In tabular text, instrument and other descriptions often appear in this margin or first column.

5) Having established the column offsets, the text in each of the neighboring header lines that matches the relevant character pattern for the header information in that line may be allocated to a column, based on the offset of the matching text. The embodiment thereby derives full column headers extending over one or more neighboring lines of text but associated with a single column. 328

6) Filter the complete set of column headers to eliminate any columns lacking any specified characteristics sought, leaving a set of core columns sharing specified characteristics. For example, were daily observations specified, column headers with weekly information should be eliminated. 332

7) Finalize the set of core columns and create an array or other data structure containing the observation dates for the data in those columns. 336 Associate with each observation date a blank curve structure for rates, which could be an array, an instance of a class, or other data structure. Each curve will contain all the rate information associated with that observation date, which is to say that appears in the related column.

8) The embodiment then tests each of the remaining lines for relevant content, for example, by testing if it contains rates or descriptive text, discarding lines that fail the test, such as lines having only whitespace. The embodiment splits lines that that have relevant content into i) a descriptive portion, if any, which is treated as part or all of the description of a specific instrument or type of rate or price, including the instrument or rate's tenor where available, and ii) any remaining portion of that line, which is split further into tokens that are then parsed as rates or prices associated with the instrument or type related to the current line, but based on different observation dates or other attributes. Where a line has descriptive text and also rates, the descriptive portion of the line is typically contained in the line's left margin. The embodiment may identify the instrument itself from the descriptive text. See E] SAMPLE CODE EXCERPTS, 4 through 6 below, "Tenor Identification and Parsing" through "Rate Identification and Parsing". Certain embodiments interpret the indentation level of descriptive text as indicating hierarchical descriptions, such as "U.S. government securities—Treasury constant maturities" in FIGS. 14A through 14C. These embodiments complete the description in the current line with any hierarchically-related information from prior lines.

9) The resulting rate or price tokens are allocated to the columns found in through steps 1) through 3) above, based on, in the case of unstructured text without delimiters, the shortest difference between their offset from the current line's beginning and the column's offset as previously determined. In the case of data with delimiters, offsets may be matched identically.

a. See E] SAMPLE CODE EXCERPTS, 3 below, "Column Placement".

b. After allocation to columns, each rate or price is associated both with the line in which appears, generally representing a table row and an instrument description, and the column in which appears, generally representing a table column and an observation date. The combination of the row, any relevant preceding rows, and the column, associates with each price or rate information such as the instrument to which the price or rate relates, that instrument's tenor and its description, including its type, and the date the price or rate was observed. The price or rate may thus be allocated to the curve associated with the relevant observation date.

c. After looping through the lines, each curve will have associated a full set of rate information for its observation date.

10) The rates or prices and related information, are then organized into groups by observation date, type of instrument and other attributes, to maximize comparability. For example, one group might comprise rates observed on a specific date on all Treasury instruments, of varying tenors, reflected in a data source. Another group might comprise rates on swaps and Eurodollar contracts observed on such a specific date. The type of the first group might comprise Treasury rates. The type of the second group might comprise swap rates.

Alternatively, the first group might comprise equity or commodity prices, credit spreads, or foreign exchange rates observed on one date, and the second group might comprise otherwise similar prices, spreads or rates observed on a different date.

11) For each type, the resulting groups are ranked by observation date and completeness, where completeness is measured by the number or extent of tenors associated with the group's benchmark rates or prices, and/or by other measures, such as by data source. In certain embodiments, the group with the highest rank, for example, the most recent group with complete data, may be automatically selected for further processing. In other embodiments, the most recent group may be selected, even if it includes fewer benchmark rates than groups with earlier observation dates, provided the number, or other measure, of the missing benchmarks in the most recent group does not exceed a specified threshold.

Other embodiments provide a human user selection means to rank various groups of data and select the group or groups of rates or prices for further processing.

The approach to implicit structure identification from unstructured text without delimiters relies not on schema, style sheets or structures external to the acquired text data, but instead solely on the text data itself to derive the needed structure.

In certain embodiments, the data decomposition module also includes data integrity and consistency verification methods to verify that the structure identified by the module is correct and useful. For example, the module may provide one or more of the following, through regular expression pattern matching or otherwise:

1) Checking means to check that the tokens into which the source data has been decomposed represent prices, rates, tenors, descriptions or other relevant attributes,
2) Missing data identification means to identify when rates or prices are missing, whether by blanks or non-numeric notation such as "n.a." or "not available",
3) Consistent grouping means to ensure that benchmarks are grouped into consistent sets, such as a set of Treasury rates and a separate set of swap and Eurodollar rates, and/or
4) Substantive integrity verification means to determine whether the rate, price or other information is reasonable and realistic, and thus reliable.

The fourth module included in certain of the currently preferred embodiments is a data entry and modification module, FIG. 3, 225, that provides means for one or more human users to modify the acquired benchmark price or rate information, to enter new or different information, and to delete existing information. The development module described below includes methods to develop a new curve based on the new or modified data, in a manner generally similar to those methods applied to data acquired by the data acquisition module in the first instance. The data entry and modification module, and the results of the development module applies to modified data, is shown for one exemplary embodiment in FIG. 10.

FIG. 4, 364-388 shows for an exemplary embodiment, the fifth module comprising a data development module which, in the case of data comprising interest rates, includes means to construct complete par, zero and forward curves, given any set of benchmark rates, using a technique from functional programming to avoid reliance on a fixed number of benchmarks. Accordingly, this module will not fail merely because the number of benchmarks changes from time to time, nor will it lose accuracy by omitting benchmarks, or should a user add new benchmarks. This development module includes several of the more popular curve development methods from the financial art, including simple linear par rate interpolation and the more robust constant forward rate interpolation method. Certain embodiments permit users to add additional interpolation and other development methods.

The data development module includes means to derive, inductively, information such as zero prices, zero rates, and other information known to be useful in the financial art, such as forward rates and "01s", the latter comprising combinations of zero prices useful for determining market sensitivity.

In certain embodiments, the data development module provides development and extension means that may include one or more, or all, of the steps in the following example. See also E] SAMPLE CODE EXCERPTS, 7 below, "Curve Interpolation". The exemplary embodiment shown in FIG. 4 includes development methods for interest rates and related information. In other embodiments, forward foreign exchange rates, forward credit spreads, or forward equity or commodity prices may be developed by the development module.

As is well known in the financial art, the mechanics of development methods for interest rates is easier if (1) all the benchmark rates that pay coupons pay them at the same coupon frequency, which is usually semiannual in the United States but may be annual or another frequency elsewhere, and (2) there is a benchmark rate with a tenor equal to a single coupon period, six months in the case of semiannual coupons. (Without the first assumption, a pro ration method is needed to compare coupon periods with different lengths.)

Under these two assumptions, tenors on benchmark instruments may be divided into short tenors and long tenors by comparison with the length of a coupon period. The instruments with short tenors each provide a single payment, facilitating the computation of a zero price. The instruments with long tenors have periodic payments, requiring a development method to compute zero prices.

For ease of exposition, the embodiment illustrated in FIG. 4 includes benchmark instruments that meet these two assumptions. Thus, the benchmark rates' tenors are either shorter than the specified coupon period, or are an integral number of coupon periods. Methods standard in the financial art address the case of other benchmark tenors, including uneven benchmark tenors and coupon periods.

The development methods of the embodiment shown in FIG. 4 include one or more of the following steps.

1) Starting with a curve of benchmark rates, entered by a user FIG. 3, 225 or acquired and selected by the system FIG. 4, 360, clone the curve for each interpolation or other development method to be applied. 364
2) Partition the benchmarks into two arrays, the first array, referred to as the short array, comprising benchmarks with the tenors that are no longer than the specified coupon period, and the second array, referred to as the long array, comprising benchmarks with tenors that are no shorter than the specified coupon period, in each case ordering the benchmarks by the benchmarks' tenors. 368 The benchmark with tenor ending after exactly one coupon period will be included in both the short array and the long array of benchmarks. In lieu of arrays, any ordered subset or other ordered data structure could be used, such as a linked list.
3) Treat the benchmarks in the short array as zero coupon benchmarks, and derive the associated rates and prices for the associated tenors using methods standard in the financial art for determining both a zero coupon rate and a zero coupon price given either a zero coupon rate or a zero coupon price associated with an instrument that provides for a single payment at its maturity. 372 In equations:

Zero price=1/(1+(zero rate)*alpha), where alpha=the day count fraction (for example, the number of days to the instrument's maturity date divided by 360) for the instrument.

The result is an array of complete developed rate information for tenors not exceeding one coupon period, comprising a complete developed short tenor rate array.
4) Create a new pair array, comprising pairs of the benchmarks in the long array, each pair comprising a benchmark and the next benchmark, based on chronological ordering. 376
5) For each pair of benchmarks in the pair array, use one or more of the interpolation or derivation methods standard in the financial art, summarized briefly below, to derive, inductively, zero prices, zero rates, and other information known to be useful in the financial art, such as forward rates and "01s", for the tenors corresponding to integral multiples of coupon periods that begin after the first benchmark's tenor and continue up to and including the second benchmark's tenor, using the zero prices and other information derived for earlier tenors from prior benchmark pairs and the short array. 380
   a) To start this inductive process with the first rate pair, use the zero price and zero rate for the tenor of a single coupon period derived from the short array.
   b) Using a standard assumption, develop the rates, zero prices and other information for tenors beginning one coupon period after the tenor of the first rate in each rate pair, starting with the first rate pair.
      i) In the case of linear interpolation, the assumption is that the intermediate tenors between the tenors of a rate pair increase linearly.
      ii) In the case of constant forward interpolation, the assumption is that the forward rate is constant for the intermediate tenors.
   c) The last benchmark of each pair will be the same as the first benchmark of the next pair, so that completion of this process for one benchmark pair provides the initial zero price and zero rate information for the next benchmark pair. The overall process is thus sometimes referred to as 'bootstrapping'. See, for example, E] SAMPLE CODE EXCERPTS, 8 below, "Sample Interpolation Implementation: Constant Forward Rate". Other methods of the financial art then provide similar information for tenors that are not integral multiples of the given coupon period.
      Certain embodiments, including the embodiment shown in FIGS. 3 and 4, delegate the technical interpolation and other development mechanics to a separate rate class. Certain of these embodiments provide to users means to modify, enhance or develop the existing rate interpolation or other development means, or add new development means, including by subclassing existing rate classes. See E] SAMPLE CODE EXCERPTS, 8 and 9 below, "Sample Interpolation Implementation Constant Forward Rate" and "Basic Full Rate Class with Basic Methods".
6) The rate pair array now consists of an array of fully developed subarrays, each comprising the result of the development method applied to a rate pair. Flatten this array and remove redundancies to create an array of complete rate information, comprising a complete long tenor rate curve, that is to say a curve of rates with tenors at least one coupon period. 380
7) Concatenate the complete developed short tenor rate curve and the complete developed long tenor rate curve to make a complete developed rate curve. 384

Figure 6:
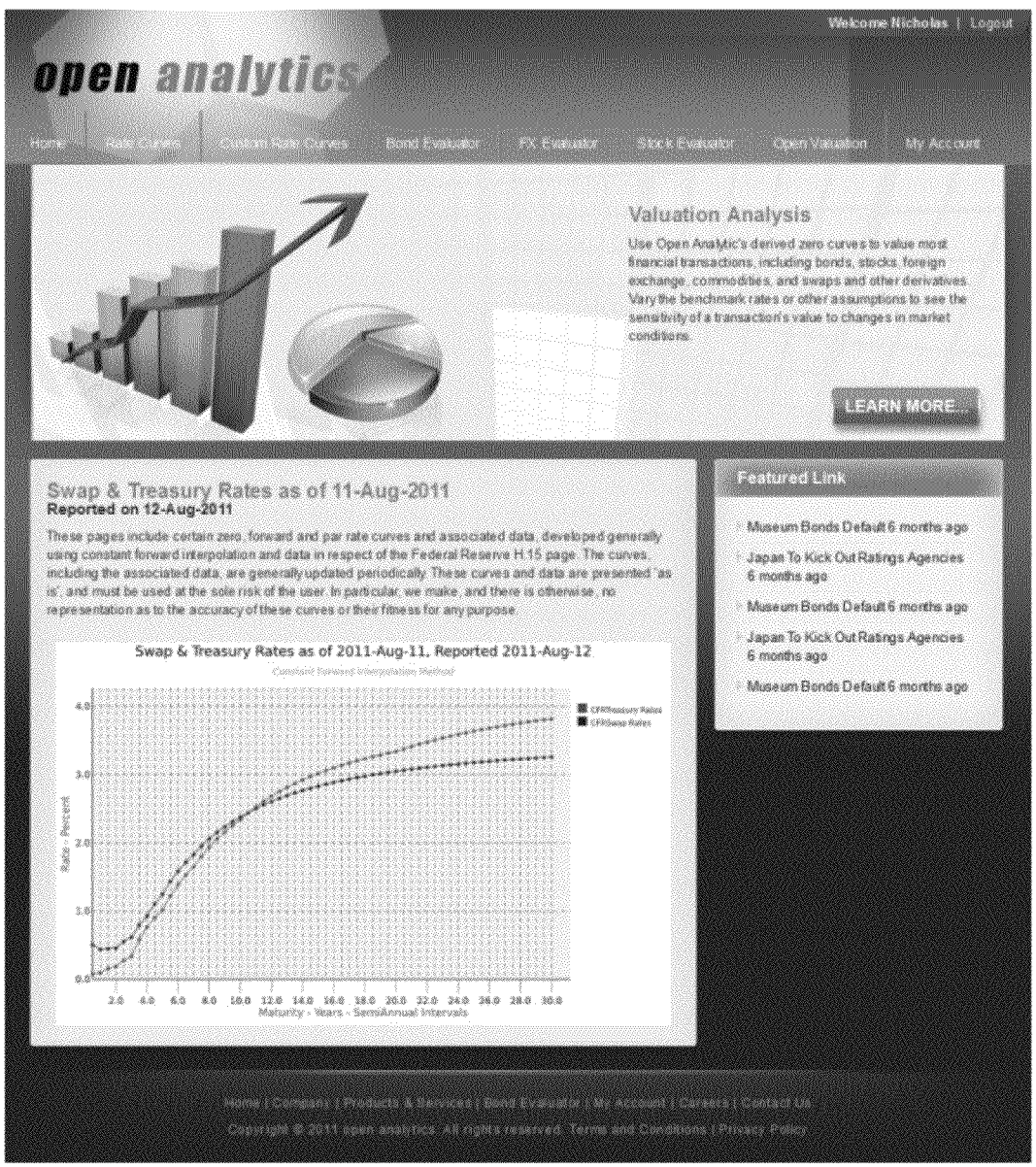
FIG. 6 shows the home page for an Internet-based exemplary embodiment, on which users may register for services from the embodiment and make any required payments.

FIG. 6 illustrates the home page for an exemplary embodiment. FIG. 5 comprises a flowchart illustrating the valuation and analysis module of this embodiment. In the embodiment, the user initiates valuation 400 for a specific transaction 410 by either selecting a specific transaction module, 415 such as bond, stock, foreign exchange, swap or option, or alternatively selects the general valuation process 420 for transactions with cash flows the amounts and dates of which the user will specify.

The embodiment produces a default base curve that the user may vary in two different ways. The user may load 425 an alternative stored base curve, for example, from an earlier date, through the embodiment's storage and retrieval module. 430 In addition, the user may modify, through the embodiment's data entry and modification module, 440 the benchmark rates of the default base curve, or the alternative base curve the user loaded, and may then develop a new base curve through the embodiment's development module. 445 The modified base curve may thus reflect credit spreads or other risk adjustments, or other features the user believes appropriate.

Having determined an appropriate base curve, the embodiment values the transaction or other series of cash flows the user enters. 450 In the case of a specific transaction module, the embodiment develops the cash flows of the transaction from the transaction terms the user has entered. The embodiment develops from the base curve zero prices corresponding to the dates of the transaction's cash flows. 450 Once the transaction is valued, the embodiment's output module displays select information, including the transaction's value, its cash flows and the corresponding zero prices, on one or more webpages. 460

Figure 11:
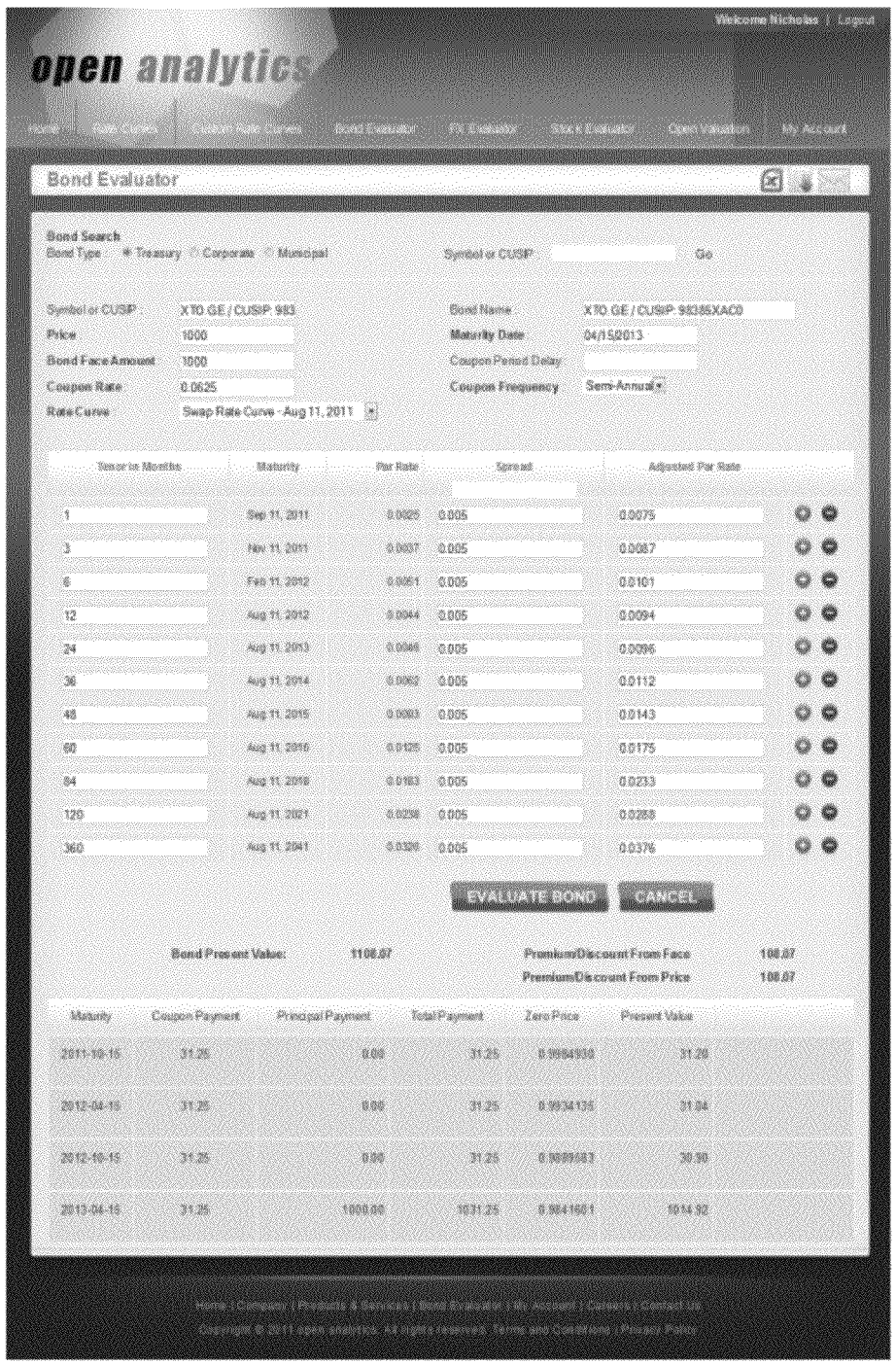
FIG. 11 shows a valuation of a bond on a webpage from that embodiment.
Figure 12:
FIG. 12 shows a valuation of a stock on a webpage from that embodiment.

FIGS. 11, 12 and 13 illustrate for an exemplary embodiment the bond evaluation module, the stock evaluation module and the general cash flow evaluation module, referred to as open evaluation.

A user may request from the embodiment additional information, analysis or other services, such as graphs of the developed base curve used in valuation against other stored or current curves, or risk measures for the transaction, derived by varying the base curve, or other market conditions, used in the transaction's valuation to determine the effect on the transaction's value. 465 Certain embodiments provide standard risk measures well-known in the financial art including, for one or more transactions, delta, gamma, vega and theta, or VaR, also known as value at risk. Transactions the terms of which a user may enter may include investments such as stocks and bonds, liabilities such as loans and other financings, and derivatives, including interest rate caps, floors and swaptions and stock options, and compound transactions with a plurality of long and short positions, and more generally transactions comprising a plurality of future contingent and non-contingent payments, whether derived from financial or other business projects, or from other sources. In addition to the valuation methods shown in FIGS. 11, 12 and 13, valuation means may include closed form analytic solutions, such as Black-Scholes option pricing formulae, and numerical methods, including both partial differential equation solution methods and Monte Carlo methods.

The user may request the embodiment to distribute, through its distribution module, to the user or others, the additional information, including the results of any additional analysis. 470

Figure 9:
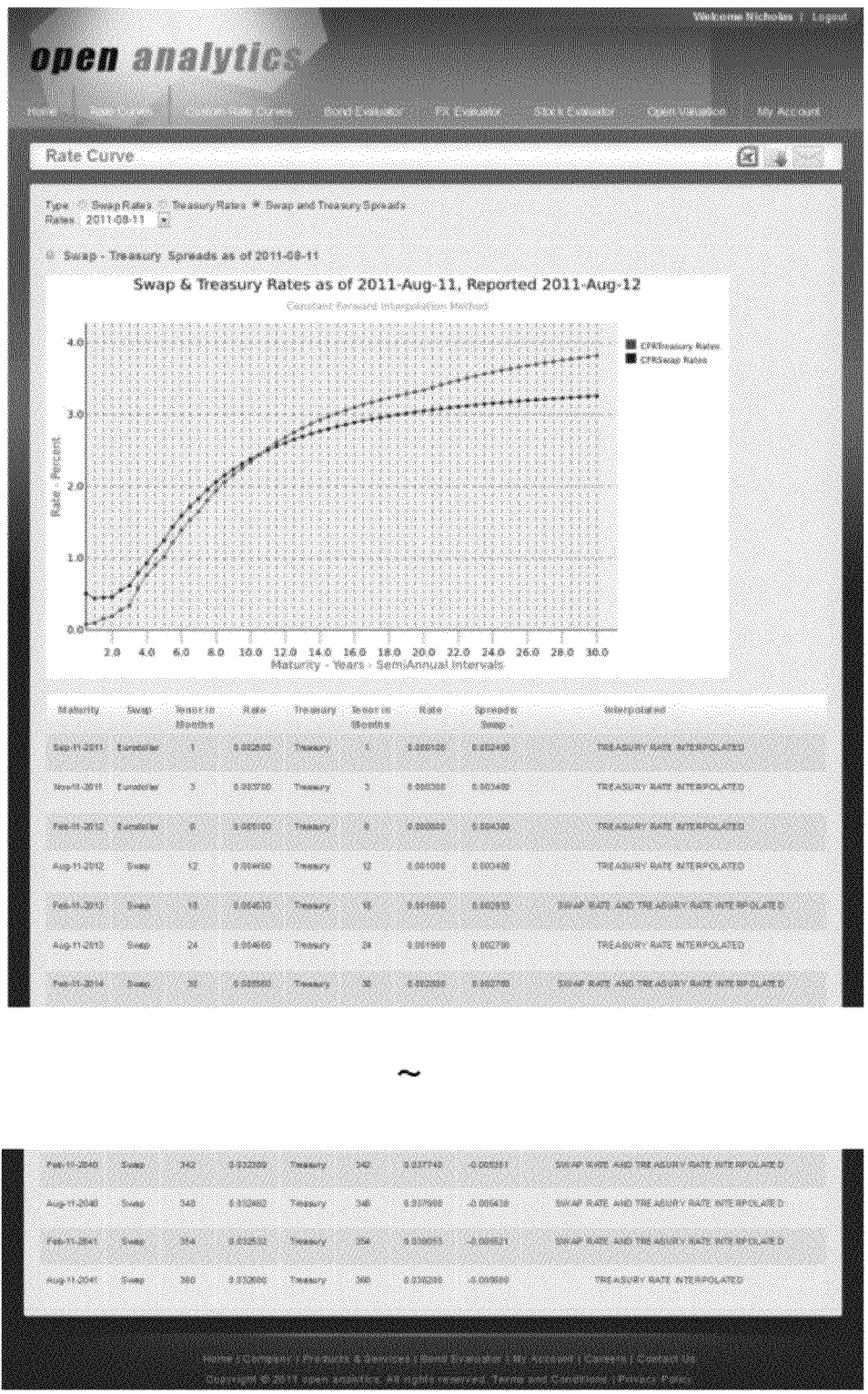
FIG. 9 shows a portion of a current curve of spreads between US swap rates and Treasury rates, from a webpage from that embodiment, available to registered users.

Certain of the currently preferred embodiments may include one or more of the following modules.
   1. Custom curve development module(s), providing users development means to develop complete curves based on data they enter through an embodiment's data entry and modification methods, or through a combination of such data and data acquired or retrieved by the embodiment. FIG. 10 shows the output from such a custom curve module's development means included in an exemplary embodiment, in which the user has entered a series of varied spreads to modify the benchmark rates provided by the embodiment's acquired rate data.
   2. Comparison module(s) providing means to group the resulting interpolated and otherwise developed curves and related data and compare them, including by developing matrices and multidimensional arrays and by subtracting rates with similar tenors to determine spreads. FIG. 9 illustrates for an exemplary embodiment a graphed comparison between a developed US dollar interest rate swap curve and a developed US Treasury rate curve, observed on the same day.

Figure 7A:
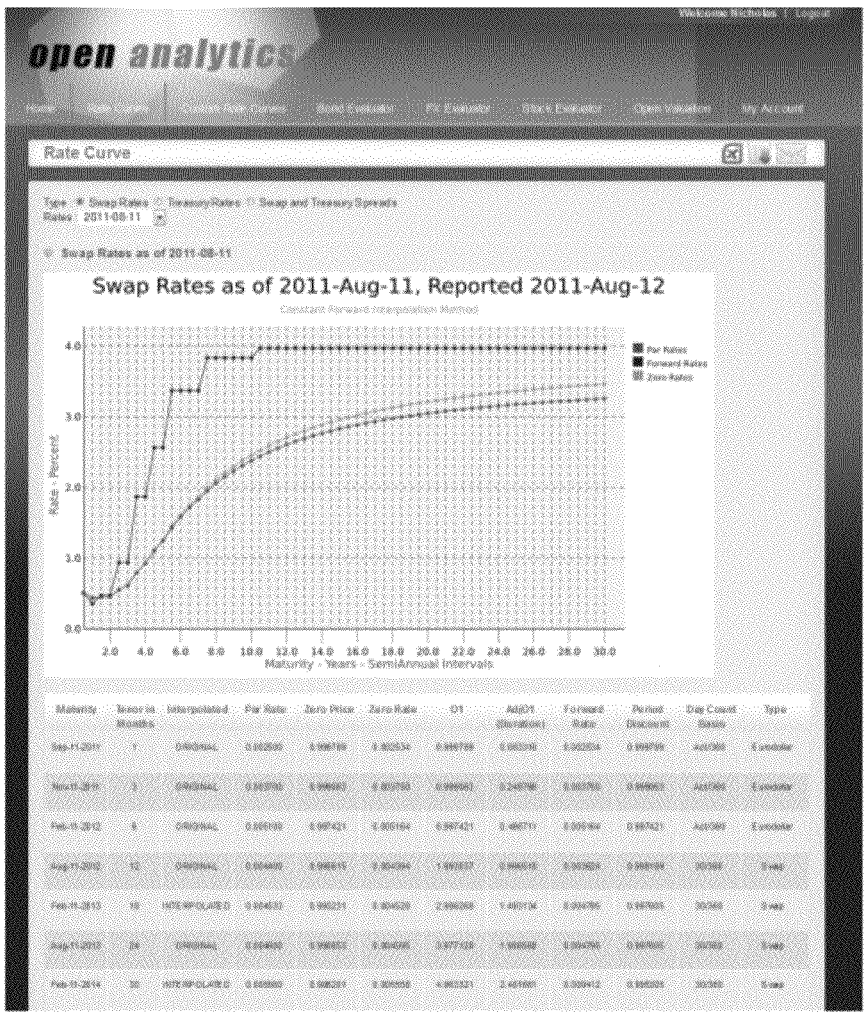
FIG. 7A shows a portion of the current US dollar swap rate curve webpage from that embodiment, available to registered users. The webpage shows a complete set of US dollar rate curves, including par, zero and forward rates, based on the US Federal Reserve's H15 page. The middle of the page has been omitted. The data is available as a webpage, as a download and/or as a periodic distribution, as shown in FIGS. 7B and 7C below.

3. Output module(s), FIG. 3, 245, 255, providing means to write the resulting interpolated and developed curves and related data, together with the results of any comparisons and headers or other explanatory or descriptive information, to files, in any one or a plurality of formats, such as text, comma-separated values, XML, HTML, database or other formats, and to produce automatically charts, graphs or other visual representation of the associated curves or data that display graphically the relationships within and among the curves and data. FIGS. 7B and 7C show swap rate data written by an output module in an exemplary embodiment and distributed to users through the embodiment's distribution module's daily emails. This data is substantially similar to the data in FIG. 7A showing the same data on a webpage also produced by the embodiment's display module.
4. Conversion module(s) providing means to convert the data into different formats, such as converting charts or other visual representations from one format to another, for example, from SVG to PNG.
5. Display module(s) providing means to display to one or a plurality of users or others the data and information, including charts or other visual representations, acquired or developed by the system, such as in HTML or otherwise as a webpage or in pdf or other document or presentation format. FIGS. 7A, 8-9 illustrate screenshots of displays for an exemplary embodiment.
6. Distribution module(s) providing means to send or otherwise distribute said output files or displayed information to one or a plurality of users or other computer networks, such as over the internet, as a webpage, through EDI or otherwise through webservices, including formatted as XML, or by email, file transfer protocol or phone text message, or over a public, private, local or other network, or as hard copy, such as printed matter or data disks, through regular mail or other physical transport, or other communication or transfer means. FIGS. 7B and 7C show swap rate data distributed to users through an exemplary embodiment's distribution module's daily emails.
7. Storage and retrieval module(s) providing means to store data and other information previously acquired, developed or provided by the system, and to retrieve information previously stored, and to display, process, analyze, develop or transmit such information using the relevant means the embodiments provide.
8. Administration module(s) providing means for an administrator or an authorized user to manage all or part of an embodiment, largely automatically with minimal supervision. In certain embodiments, the administration module may schedule a program to run that operates an embodiment's host computer system automatically each minute, hour, day, week, or other period, or on specified dates or times, or on the happening of certain events, such as an update or other change to certain data or other information monitored by the embodiment or an administrator. These periods, dates, times or events at or after which the embodiment operates may be specified by the system, by an administrator by an authorized user. The administration module's scheduling of an embodiment's host computer system's operation may include means to schedule the execution of the processes of that embodiment to provide services, such as information distributions, to one or a plurality of users or others. FIGS. 7B and 7C show interest rate swap data automatically distributed to users by one exemplary embodiment. This data, together with US Treasury and swap-Treasury spread data, is distributed on each day on which new data is available, a condition the embodiment monitors.

Embodiments may include any one or more of the modules described above, and may include multiple modules of the same numbered type.

SAMPLE CODE EXCERPTS

All excerpts are based on the Ruby programming language, in which ";" can act as a line termination character and "#" indicates comment text. For the Ruby specification, see "http://ruby-std.netlab.jp/draft_spec/download.html". Those skilled in the art of programming and finance will readily apprehend how these excerpts may be modified, expanded and/or replaced, for example, by writing comparable computer code in a different computer language, such as Python, Java or C++, or by adding new features or modifying features. Note that identification methods may be based on regular expressions, as shown below. The texts of numbered comments appear beneath the code excerpts.

1. Acquire Data From WebPage
   require 'open-uri' # Required Ruby library to access and download Webpage data as a IO stream.
2. Column Header Identification
   @@tm=Time.now;    @@curYearNum=@@tm.year;
   @@year=@@curYearNum.to_s# gets year as string;
   @@nYear=(@@curYearNum+1).to_s   #next year;
   @@pYear=(@@curYearNum-1).to_s   #last year;
   @@yearRe=Regexp.new(@@year+'|'+@@nYear+
   '|'+@@pYear); @@token='Instruments' # a bespoke indicator particular to the specific source
   @@tokenRe=Regexp.new(@@token)
   @@monthRe=/Jan|Feb|Mar|Apr|May|Jun|Jul|Aug|Sep|Oct|Nov|Dec/
   text.each do |Line|
     if   secondPriorLine=~@@yearRe && priorLine= ~@@tokenRe && priorLine=~@@monthRe
       # Designate Header Rows—'scanX' returns [matching substring, offset]
       @headings=@@monthRe.scanX(priorLine) # set column offsets
       @cols=@headings.collect{|e| e[1]}
       @@leftMargin=@cols[0] #The left margin of the table
       @colsX=@cols.addX # add the indices to the columns @cols; addX is a custom array method: def addX; self.zip(Array.new(self.size){|i| i}).collect {|e| e.flatten}; end
       aSpec=@@yearRe.scanX(secondPriorLine); bSpec=@@dayRe.scanX(Line)
       aaSpec=placeCols(aSpec);bbSpec=placeCols(bSpec)
       # Additional Header processing omitted from excerpt
     else; secondPriorLine=priorLine; priorLine=Line; end; end; end
3. Column Placement
   def placeCols(a) # The argument "a" is an array of length 2 subarrays, each subarray comprising a token followed by the offset, which is the location where that token appears in the relevant line, with subarray indices 0 and 1, respectively. @colsX is an array of subarrays, each subarray comprising a column offset followed by the index of that column, again with subarray indices 0 and 1.
   a.map{|e|  @colsX.map{|c|  e.dup<<(c[0]-e[1]).abs<< c[1]}.min{|a,b| a[-2]<=>b[-2]}}; end 4. Tenor Identification and Parsing
class Tenor
    @@tenorRe=/\d+-[A-z]+/; @@tenorDelim='-' # tenor string splitting delimeter
    @@bigTimeUnit=/year/i #an indicator of whether the tenor string measures months or years. Tenors are may be converted to months, when possible, a choice easy to modify
    @@month=/month/; @@week=/week/
attr_accessor :tenorStr, :tenorUnit, :mult, :tenorUnits, :tenorMonths, :tenorInMonths, :tenorFound
    include Enumerable # to have a sorting method based on an '<=>' operator, which will generally be based on months.
    def initialize(s) # the argument is a string representing the current line
        if ((@tenorMatch=@@tenorRe.scanX(s,0,true))#if a tenor substring matching @@tenorRe was found, parse the string argument s as a tenor. Otherwise, just return
5. Description, Identification and Parsing
class DescStack
    @@inc=0
    @@descRe=/(?:\w\W+[A-z]|[A-z\.\-\(\)])+/#Alternatives: /(?:[A-z] [A-z]|[A-z\.\-]|\d+\s*-)+/#/(?:[A-z] [A-z]|[A-z\.])+/
    def initialize; @ stk=[ ]; end
COMMENT 1. The text of these and other numbered comments appear in the next subsection below.
    def add(l)
        return if !(u=@@descRe.scanX(l,0,true)); u=u[0]; # do nothing if there is no descriptive information. Otherwise pull out the first, and only, description and then pop until less-indented text is found, searching for hierarchically-related text. Any more-indented text has presumably already been written out with the method 'out' below and associated with a prior rate.
        until ((@stk.size<1 || @stk.last[1]<u[1]-@@inc); @stk.pop; end
        @ stk<<u; end
    def out; a=@stk.collect{|e| e[0]}; a.join('-'); end # collect the stack information in a string
6. Rate Identification and Parsing
class Rates<Rate
    class variables inherited from parent class Rate:
    @@descStack=DescStack.new;
    @@wordsRe=/\S+/;
    @@rateRe=/\d+\.\d+/def
    def initialize(Line=nil, r=nil,d=nil,t=nil,tn=nil,int=false) # The argument Line=the current line to be parsed potentially containing rates and/or a description of rates
    rateArray=@@wordsRe.scanX(Line,@@leftMargin)
    #the nx2 array of numeric alphanumeric tokens and columns, starting after the left margin @@leftMargin
    rateArray=rateArray.collect{|e| @@rateRe=~e[0]? [Float(e[0])/@@rateDivisor,e[1]]: [nil,e[1]]} if rateArray # Reparse the individual tokens to find floating point numbers; replace the other tokens with nil.
        @tenor=Tenor.new(Line) # match the current line with @@tenorRe to find a tenor if there is one. A reasonable assumption is that either there is a description, or there is a tenor. If there is a tenor, the rate description must come from prior lines. Delegate to the 'Tenor' class the task of getting and parsing the tenor
        if @tenot.tenorFound # empirically, if there's a Tenor, then there's no current description in the left margin, so get the description off the pre-existing @@dStack @desc=@@dStack.out # assume there is no description in Line so obtain it from the existing description stack accumulated from previous lines
    else # Otherwise, leave @tenor at nil and update @@dStack with the current line's descriptive text
        @@dStack.add(Line); @desc=@@dStack.out # get the description from the updated @@dStack
        @tenor=Tenor.new(@desc); @tenor=nil if !@tenor.tenorFound; end # Try to recover a tenor from the accumulated descriptive text; if this fails, leave @tenor as nil
    @hasTenor=@tenor ? true : false; end # Set @hasTenor to indicate whether or not there is a tenor substring.
7. Curve Interpolation
class Curve
attr_accessor :date, :desc, :type, :rateAr, :lastSwapDate, :repDate, :repDateStr, :dateStr, :header, :rateHeader,
attr_accessor :name
include Enumerable # to have a sorting method based on the '<=>' operator below
    @@ shortTerm=6 # short term rates are no longer than 6 months
    @@baseUnitShort=3 # the base period for short term rates is a quarter, or three months
    @@baseUnitLong=6 # the base period for intermediate and long term rates is six months
    @@getHeader=lambda{|dO,dC| hStr=<<EOF; Date Reported: #{dO}; Date of Curve,#{dC}; All Rates in Decimal Notation; Original Rates from Federal Reserve Publication H15; EOF} # a proc to generate a header string for output
    def self.selRate(tp, re); lambda{|c|Curve.new(c.date, c.desc,tp,c.rateAr.select{|r| r if r.desc=~re})}; end # Returns a 'proc' that, passed a curve, selects those rates with description matching a given pattern re, and labels the curve with the specified type tp. This proc can be passed to a collection of curves with 'map' to create a collection of curves of the selected rates.
    def initialize(d, ds, src=nil, t=nil, repD=nil, ra=[ ])
        @date=d; @dateStr # the curve date, the date on which the curve was observed and a string representation of the curve date
        @desc=ds; @source=src; @type=t; @repDate=repD; @rateAr=ra; @shortAr;
    @longAr; @repDateStr # several instance variables, the first five set from the initialization method, including the reporting date of the curve, necessarily >=the curve date, and the last three including arrays for the short and long rates and a string representation of the reporting date
    @header; @rateHeader; end # Two class variables for headers; end initialization
    def setType; if @type; @rateAteach{|r| r.type=@type if !r.type}; end; end # a utility method to set the type of the rates in the rate array from the curve type.
def getHeader # Signature: <Curve>.getHeader: <Curve>->[String] @header. An instance method to get the header, based on the curve date and reporting date.
    @dateStr=@date ? @date.strftime("% Y-% b-% d"): 'no valid curve date found'
    @repDateStr=@repDate ? @repDate.strftime("% Y-% b-% d"): 'no valid reporting date found'
    @header=@@getHeader[@repDateStr,@dateStr]; end # call the lambda to make the header and end the method.
COMMENT 2
def interp
    short, long=rateAr.partition{|e| e.getTenorMonths< e.class.cPeriod} # Note the bias towards long rates created by '<'. This results in the long rates starting with the last short rate (maturity=1 coupon period) and the short rates missing this rate. We'll fix this next.
  short<<long[0] # Create redundancy by adding the first long rate back to the short rates. This way, after getting the full rate information for the short rates, the long rates will start with a rate with full rate information, in effect initializing so we can begin the 'bootstrap'. Because long[0] is an object passed by reference, processing short[−1] will also initialize the array of long rates long.
  short.map!{|e| e.getAll} # Get all rate information for the short rates, since there's no dependence on a prior rate because all short rates are effectively zero coupon rates.
  pairs=long.lagPairs # lagPairs' is a custom method added to the Array class. A typical implementation would comprise: def lagPairs; self[0 . . . −2].zip (self[1 . . . −1]); end
  long=pairs.inject([ ]){|ar, e| ar<<e[0].class.interp(e)}; long.map!{|e| e.size>1 ?
e[1 . . . −1]: e}.flatten!; @rateAr=short+long; end # Call the interpolate method of the relevant rate class on each pair in the array pairs, after which combine the long and short arrays and end the method.
  def <=>(x); self.rateAr.size==x.rateAr.size ? self.date <=>x.date : self.rateAr.size
<=>x.rateAr.size; end # adding a "<=>" operator to sort with the Enumerable module.
8. Sample Interpolation Implementation: Constant Forward Rate
COMMENT 3
class ConstantForwardRate<BasicFullRate
  @pComp=Poly.new;  @pComp.it=2000;  @name= "Constant Forward Rate Interpolation" # Class variables include a Poly object, with maximum iterations set.
  class<<self # interpolation is a class method
  # COMMENT 4
  def interp(ratePair)
    getPeriods if ! @ gotPeriods # Initialize certain variables if not yet done
    num2Interp=((ratePair[1].getTenorMonths-ratePair[0].getTenorMonths)/ @cPeriod.to_f).round; ratePair[1].getPeriods(false) # Get the number of rates to interpolate and set certain basic rate information for the ending rate.
    # COMMENT 5
    ply=[ratePair[0].O1*ratePair[1].proRate-1]+
([ratePair[0].zero*ratePair[1].proRate]* num2Interp);
ply[-1]+=ratePair[0].zero; @pComp.p=ply; disc=@pComp.nS( )# add the principal payment at maturity to the final payment, and then set the polysolver's polynomial instance variable to the array ply and solve for the constant forward discount disc.
    if num2Interp <2 # nothing to interpolate; the two rates are one coupon period apart.
      ratePair[1].getAll(ratePair[0],disc); ratePair
    else # COMMENT 6
      base=ratePair[0].dup;  base.interp=true; startRate=base.rate; endRate=ratePair[1].rate; interpAr=(0 . . . num2Interp-1).inject([ratePair[0]]){|ar, x|ar<<base.dup.getAll(ar.last,disc,true,true); ar};
      interpAr<<ratePair[1].getAll(interpAr[-1],disc); interpAr;
    end; end; end
  attr_accessor :interp # Access this protected variable from the class instance function interp
  def initialize(r=nil, d=nil, t=nil,tn=nil, int=false, disc=nil);
    super(r,d,t,tn,int) # call the superclass constructor;
    @discount=disc # if given a discount, set the instance discount variable for zero computations; end
We now override certain methods from BasicFullRate with methods customized to ConstantForwardRate, starting with the method getDisc. If the discount was set as part of intiailization, return it; otherwise, it's a short rate and return the zero computed normally.
  def getDisc(*args); if @discount; @discount ; else; @discount=@zero; end; end
  def getLongZero(priorRate);  @zero=priorRate.zero*@discount if priorRate; end
  def getAll(priorRate=nil,  disc=nil,  getTenor=false, getRate=false);
    getPeriods(priorRate ? false : true) if ! @gotPeriods; @discount=disc  if  disc;  @tenor=priorRate.getTenorMonths+@cPeriod if getTenor; super(priorRate); @rate=@perYear*(1-@zero)/@ 01 if getRate; self; end; end # if it's a long rate, we need to compute the par rate from the zero and the 01. Finally, we need to return the rate with full rate information (self) to make available to the interpolation method.
9. Basic Full Rate Class with Basic Methods
class BasicFullRate<SimpleRate # SimpleRate is a short class with rudimentary Rate information. BasicFullRate performs the basic 'housekeeping' financial tasks required for handling rate information.
  @@intro="Rate Data, Interpolation Method:"; @@columnHeader=",,,See  Day  Count,,Continuous,,,Continuous\nMaturity, Tenor in Months,Interpolated, Par Rate,Zero Price,Zero Rate,O1,AdjO1(Duration), Forward Rate,Period Discount,Day CountBasis,Type";
  @@header=@@intro+"\n"+@@columnHeader
class<<self
attr_accessor :lDayCount, :sDayCount, :yLUnits, :ySUnits, :cPeriod, :perYear, :truePerYear, :proYear, :gotPeriods, :trueProYear, :gotHeaders, :diffShortConvention, :basis, :name
  # COMMENT 7
  def getPeriods(yLU='30/360', ySU='Act/360', c=6);
    @lDayCount=yLU;
    @sDayCount=ySU;  @yLUnits=@@dayCount[@lDayCount]; @ySUnits=
    @@dayCount[@sDayCount];  @cPeriod=c; @perYear=@yLUnits.to_f/@cPeriod;
    @truePerYear=@perYear;  @proYear=1/@perYear; @trueProYear=@proYear;
    @gotPeriods=true;  @diffShortConvention=true; @basis=@lDayCount; end
attr_accessor :intro, :columnHeader, :header
def getHeaders(specific="") # a method to construct headers; @intro=(specific ? specific+" ": " ")+@@intro+ @@dlm+@name;
    @columnHeader=@@columnHeader;
    @header=@intro+"\n"+@columnHeader;
    @gotHeaders=true; [@header,specific] end; end
attr_accessor :type, :lDayCount, :sDayCount, :yLUnits, :ySUnits, :short, :basis, :cPeriod, :perYear, :truePerYear :proYear, :trueProYear, :proRate, :gotPeriods, :zero, :O1, :adO1, :zRate, :fwd, :discount # Included :type here so we can set the type from a curve def initialize(r=nil, d=nil, t=nil, tn=nil, int=false,z=nil,o1=nil)
    self.class.getPeriods if !self.class.gotPeriods # if this is first instantiation, initialize the Periods class instance variables self.class.getHeaders if !self.class.gotHeaders # if this is first instantiation, initialize the Headers class instance variables
super(r,d,t,tn,int)
@zero=z; @O1=o1; @adjO1; @zRate; @discount; @fwd; @lDayCount;
@sDayCount; @yLUnits; @ySUnits; @short=false; @basis; @cPeriod;
@perYear; @truePerYear; @proYear; @trueProYear; @proRate;
@ gotPeriods=false; end 10. Numbered Comments to Code Excerpts COMMENT 1: The following method "add" adds a character string containing possible descriptive information to the stack represented by a DescStack instance. Note that previous items in the stack are deleted (popped) until the current indentation (offset) exceeds that of the last item in the stack. Thus, the add method effectively removes strings from the stack until the last item is a higher topic or chapter heading, having a smaller indent, than the current line's text, following the empirical rule that subtitles are further indented than titles. When the stack has been emptied until the top item is of higher order than the item in the current line, we add the current line's text to the stack and the stack represents a path of headings to the item in the current line. By way of comparison, were we building a tree model of a table of contents, we would not pop, but instead pass up to the tree to parent nodes until we reach a parent node that has a lower level of indentation, and then insert the current line's text as a new child node under that parent node. Thus, the add( )method may, for example, generate the description "U.S. government securities—Treasury constant maturitie—Nominal—1-year" from the text data shown in FIGS. 14A and 14B.

COMMENT 2: The signature of the following method "interp" is: <Curve>.interp: <Curve.rateAr>->Curve.rateAr. The method's primary consequence is a side effect that alters the current curve's attribute "rateAr". Before this method is called, the Curve.rateAr is an array of rates that represents only benchmark observable par rates from the market, while after the method is called that array represents a more complete rate curve with a fuller range of zero and other rates and other information. Note that there is also an "interp" class method of each relevant Rate subclass, which the Curve "interp" class calls, as described below.

The operation of the method is illustrated in FIGS. 3 and 4, 235, 364-388, discussed above, and may be summarized as follows. Starting with an array of benchmark rates, the method partitions it between short rates, which have maturities no later than one coupon period, and long rates, which have payment dates on integral multiples of coupon periods. First, the method computes the rate information for the short rates, using that all these rates are in effect zero coupon rates. The method then clones two copies of the long rates, shifting one copy, popping the other, and zipping the two resulting arrays to make an array of consecutive rate pairs that can be interpolated and "bootstrapped". The method "bootstraps" the pairs by starting with full rate information for the earlier rate in each pair and using that information to get the rate information for the later rate in the pair along with any new interpolated rates corresponding to intermediate dates. The method calls the relevant rate subclass "interpolate" method for each of the pairs of rates, to fill in any missing intermediate rates and to compute full rate information including, for example, zero prices and O1s, using the custom interpolate method associated with the relevant rate subclass. Thus, the interpolation computations are delegated to the specific rate subclasses, to which in certain embodiments users can add.

Because the actual interpolation and "bootstrapping" of rate pairs is delegated to the relevant rate subclass, these methods are encapsulated and polymorphic. Thus, new interpolation and "bootstrapping" methods may be developed easily by creating new subclasses of the relevant rate classes, which in an exemplary embodiment from which the code excerpts are taken is a class called "BasicFullRate", a subclass of a parent class called "SimpleRate". The rate subclasses include the classes LinearParRate and ConstFwdRate.

COMMENT 3: All Rate classes inherit from a base rate class with robust basic information and basic methods, such as day count pro ration and derivation of forward rates from discounts. In this exemplary embodiment, the base rate class is called BasicFullRate, and the illustrated rate subclass is called "ConstantForwardRate". The ConstantForwardRate class includes as a class variable an instance of the Poly class. Poly is a class encapsulating any standard algorithm to solve for zeros of polynomials, such as Newton's method, as in the code excerpt, where the maximum number of iterations is set to 2,000. One of Poly's methods, called "nS( )", finds zeros of a specified polynomial through Newton's method or other appropriate method. An example of such a method appears in Press, Teukolosky, Vetterling, Flannery, *Numerical Recipes in C* 376 ($2^{nd}$ ed Cambridge University Press 1992).

COMMENT 4: The interpolate method "interp" is a class method of each relevant Rate subclass, as indicated in COMMENT 2 above. Here, in the ConstantForwardRate class, the ConstantForwardRate interpolate method takes a start rate and an end rate pair, with full information only for the start rate, and returns an array of the form [start rate, [interpolated rates], end rate], with full rate information for all rates in the returned array.

COMMENT 5: See COMMENT 3 above. Having obtained the par rate of the ending benchmark, pro-rated for day count, this interpolate method constructs a polynomial, comprising an array of coefficients of the various powers of the polynomial variable "x", from this rate. The method then calls the solve method nS( ) of the Poly object @pComp to compute the next constant discount factor (=1/(1+constant forward)). The polynomial's constant term equals the product of the most recent 01 multiplied by that pro-rated par rate, minus 1 for the par value of the associated par bond. The other terms represent prorated coupon payments on each of the "n"="num2Interp" dates comprising the intervening coupon dates between the maturities of the first and last rates in the rate pair, and a final coupon date on the date of the final principal payment at maturity, equal to 1. In each such term, the payment is partially discounted by the zero price associated with the maturity of the first rate in the rate pair, which is the latest available zero price. The objective is to solve for the (by assumption, constant) discount rate associated with the intervening period between those first and second benchmark rates in the rate pair. Each of these partially discounted payments is thus fully discounted when multiplied by "x", representing the constant discount rate to be computed, raised to the appropriate power reflecting the remaining number of periods until that payment is made. Finally, that latest available zero is added to adjust the coefficient of the highest-order term in the polynomial, reflecting the principal payment, equal to 1, at maturity.

The degree of the polynomial is thus n, and the polynomial is: $0=-1+01*proRate+sum(zero*(constant\ discount)^i * proRate)+zero*(constant\ discount)^n*1$, where proRate is the par rate associated with the second benchmark rate in the rate pair, prorated for a coupon period, and "zero" and "01" are the most recent zeros and 01s, respectively, and we are to solve for "(constant discount)". The sum is from 1 to n, since the initial, or "$0^{th}$", order term is the constant term (−1+01*proRate). Rewriting the polynomial as:

1=01*proRate+sum(zero*
(constant discount)^i*proRate)+
zero*(constant discount)^n This polynomial in effect says that the par value of a bond with the maturity date and coupon rate of the second benchmark, which par value must necessarily equal 1, must also equal the sum of the present value of payments at the second benchmark rate through the maturity of the first benchmark (the first summand), plus the sum of (a) the present value of remaining payments at that rate through the maturity of the second benchmark, and (b) the present value of the principal payment (namely 1) at that maturity, each such payment additionally discounted at the assumed constant discount rate (the second and third summands, respectively).

COMMENT 6: If the variable "num2Interp" is greater than 1, there are new intervening rates which will be interpolated rates. Since we have solved for the constant forward discount, generally equal to (1/(1+(constant forward rate)*(day count))) and which will by assumption be the same for all the interpolated intervening rates, we can create each interpolated rate by starting with a copy of the first benchmark rate from the original rate pair, modifying certain of its properties—such as to show that these rates are interpolated, not original -, and then iteratively multiply the zero price for the most recently computed interpolated rate by the constant discount to get the zero price for the next interpolated rate. As is well known in the financial art, once the zero price for a specified maturity is determined, the zero, par and forward rates, and all other rate information, may be determined from that zero price and zero prices for earlier maturities.

COMMENT 7: The class variables specified in the method 'getPeriods' represent the following quantities, in order:
1. "@lDayCount" equal to the day count convention for multi-coupon (long) rates;
2. "@sDayCount" equal to the day count convention for single or zero coupon (short) rates;
3. "@yLUnits" equal to the number of units, by default 12 months, in a year for long rates;
4. "@ySUnits" equal to the number of units, by default approx 11.84 months, in a year for short rates, reflecting the default day count convention for short rates;
5. "@cPeriod" equal to the number of units in a coupon period, presumptively six months, but for shorter rates, a shorter period may override this;
6. "@perYear" equal to the number of coupon periods in a year, two by default;
7. "@truePerYear" equal to the default number of coupon periods in a year, which may differ from @perYear in certain instances as a result of the day count ;
8. "@proYear" equal to the portion of a year in a coupon period;
9. "@trueProYear" equal to the default portion of a year in a coupon period, which may differ from @proYear in certain instances as a result of the day count;
10. "@gotPeriods", a Boolean for which the call to attr_accessor provides a default of nil automatically;
11. "@diffShortConvention" equal to true if the day count convention for short rates differs from that for long rates, which is ordinarily the case; and
12. "@basis", which sets the default for the day-count basis for a rate.

SERVICE DELIVERY MODEL

The currently preferred embodiments of the present invention provide several tiers of service, each providing additional or different revenue. For example, in certain exemplary embodiments these tiers may include one or more of the following.

1. A free service provided on webpages over the internet. This service provides limited information to all users anonymously and generates modest revenue through a small number of advertisements.

2. A more comprehensive free service, also over the internet, providing more extensive information. This service requires user registration, including a valid user email address and certain other information, and generates revenue through a small number of advertisements with a low profile that do not distract from the functionality of the service.

3. A subscription service, based on registration and payment of a modest monthly or other periodic fee, which is provided over the internet or other network. This service provides complete sets of information daily or otherwise periodically on detailed webpages, with no advertisements.

4. For a small additional periodic fee, a user can upgrade to a services that provides daily or other periodic emails to the user's registered email address. These emails include attachments that contain all the information provide on the webpages, in a form that users may save easily and use freely on their local machines or networks, in addition to downloads of current and possibly certain historic information directly from the embodiment's website.

5. For more significant periodic fees, including a one-time sign-up fee, a user can register for additional subscription services providing complete access to historic information that the embodiments store, and can compare data from different times or markets, or other criteria. Certain of these additional services may also allow users to enter their own data or other information, or modify the system's information, and to enter the terms of transactions, which the users may then value or risk-manage, based on the embodiment's data and other information, and the embodiment's analytic methods, as well as any information the users enter.

6. For more significant periodic fees, including a one-time sign-up fee, one or more users can register for other additional subscription services providing risk management services, such as a value-at-risk service, for one or more user or other portfolios, comprising
   (a) communications methods for a user to upload or otherwise transfer information describing the composition and other terms of one or more portfolios of assets of the user or another,
   (b) analysis methods to estimate the potential of the value of each such portfolio to change with changes in market conditions, such as a specified number of standard deviation moves, or other specified changes, in the market levels acquired and developed by embodiments of the present invention, or through Monte Carlo simulation or other means known in the financial art for analyzing potential scenarios based upon potential variation in such levels, and
   (c) communication methods to download or otherwise transfer to users the results of such analysis in graphic, tabular data or other form, including as a risk estimation report. Alternatively or additionally, said users may download information that permits/enables such analyses to be made on their local platform; and, in accordance with an optional aspect of these embodiments, the subscription fee may be paid/subsidized by the user's financial advisor and provided to said user as a "risk audit" or "sanity check" on the advisor's, user's or other's portfolio selection.

7. The more robust and expensive services provide users detailed current and historic information, and extensive valuation, risk management and other analytic services, including in certain embodiments direct programming access to the embodiments' information and analytic methods through an applications programming interface. Certain embodiments offer users custom capabilities developed from the general services to meet those users' specific requirements.

Because the cost of the systems and methods these embodiments provide is very low, costing practically nothing to add an additional user, the user fees for even the most extensive of the services the embodiments provide should be significantly lower than any of the comparable services currently available in the financial information and analytic art. The services embodiments of the present invention provide also have the other advantages described in A] BACKGROUND OF THE INVENTION above.

CLAIMS

One skilled in the art will appreciate that the present invention can be practiced by other than the described embodiments, which are presented for purposes of illustration and not of limitation. Those skilled in the art will have no difficulty devising obvious variations and enhancements of the invention, all of which are intended to fall within the scope of aspects of the invention which I may claim.

What I claim as my invention in this application is:

1. A financial information/analysis system, comprising at least a computer-readable memory containing at least the following computer-executable objects
    a) a CurveMaker object, configured to receive one or more Uniform Resource Locator(s), each corresponding to a webpage, and generate one or more rate objects by instantiating a RateTable object for each Uniform Resource Locator;
    b) each instantiated RateTable object configured to invoke a getData( )method to obtain data from the webpage or a local copy thereof, utilize regular expression scanning to ascertain header and tenor information therein, utilize said ascertained header and tenor information to decode numerical rate information therein, and associate said decoded numerical rate information with a plurality of rate subclasses;
    c) said plurality of rate subclasses including at least a ConstFwdRate subclass and a LinearParRate subclass, the ConstFwdRate subclass used to hold rates, including zero prices and forward rates, calculated by constant forward interpolation, and the LinearParRate subclass used to hold linearly-interpolated rates, including par rates and bootstrapped zero rates.

2. The system of claim 1, further including at least one Internet-connected server, configured to execute said CurveMaker object.

3. The system of claim 1, wherein at least one of the webpages includes Federal Reserve H.15 data.

4. The system of claim 1, wherein at least one of the webpages includes European Central Bank data.

5. The system of claim 3, wherein the H.15 data is formatted for reading by a human, rather than a computer.

6. The system of claim 1, further comprising a webserver configured to (1) execute said CurveMaker object, (2) utilize rate information computed by said CurveMarker object to evaluate an investment vehicle, and (3) report results of said evaluation via the Internet.

7. The system of claim 6, wherein said investment vehicle comprises a bond.

8. The system of claim 6, wherein said investment vehicle comprises a stock.

9. The system of claim 6, wherein said investment vehicle comprises an interest rate swap.

10. The system of claim 6, further comprising (4) means for manually modifying or overriding numerical rate information decoded by the getData( )method, and (5) code for reevaluating the investment vehicle using the manually modified or overridden data.

11. The system of claim 1, further comprising (4) means for manually modifying or overriding numerical rate information decoded by the getData( )method, and (5) code for reevaluating the LinearParRate and/or ConstFwdRate subclass(es) based upon the manually modified or overridden numerical rate information.

12. A method for computing financial information, comprising:
    instantiating a CurveMaker object in the memory of an Internet-connected server, the CurveMarker object configured to receive one or more Uniform Resource Locator(s), each corresponding to a webpage, and generate one or more rate objects by instantiating a RateTable object for each Uniform Resource Locator;
    each instantiated RateTable object configured to invoke a getData( )method to obtain data from the webpage or a local copy thereof, utilize regular expression scanning to ascertain header and tenor information therein, utilize said ascertained header and tenor information to decode numerical rate information therein, and associate said decoded numerical rate information with a plurality of rate subclasses;
    said plurality of rate subclasses including at least a ConstFwdRate subclass and a LinearParRate subclass, the ConstFwdRate subclass used to hold rates, including zero prices and forward rates, calculated by constant forward interpolation, and the LinearParRate subclass used to hold linearly-interpolated rates, including par rates and bootstrapped zero rates.

13. The method of claim 12, further including receiving, over the Internet, an instruction to execute said CurveMaker object.

14. The method of claim 12, wherein at least one of the webpages includes Federal Reserve H.15 data.

15. The method of claim 12, where at least one of the webpages includes European Central Bank data.

16. The method of claim 14, wherein the H.15 data is formatted for reading by a human, rather than a computer.

17. The method of claim 12, further comprising (1) using rate information computed by said CurveMarker object to evaluate an investment vehicle, and (2) reporting results of said evaluation via the Internet.

18. The method of claim 12, wherein said investment vehicle comprises a bond.

19. The method of claim 12, wherein said investment vehicle comprises a stock.

20. The method of claim 12, further comprising (3) manually modifying or overriding numerical rate information decoded by the getData( )method, and (4) reevaluating the investment vehicle using the manually modified or overridden data.

* * * * *